(12) United States Patent
Hokimoto

(10) Patent No.: US 7,900,730 B2
(45) Date of Patent: Mar. 8, 2011

(54) ROTARY WORKING MACHINE

(75) Inventor: Kazuya Hokimoto, Chikugo (JP)

(73) Assignee: Yanmar Co., Ltd, Osaka (JP)

( * ) Notice: Subject to any disclaimer, the term of this patent is extended or adjusted under 35 U.S.C. 154(b) by 440 days.

(21) Appl. No.: 11/994,584

(22) PCT Filed: Jan. 19, 2006

(86) PCT No.: PCT/JP2006/300736
§ 371 (c)(1),
(2), (4) Date: May 7, 2008

(87) PCT Pub. No.: WO2007/004330
PCT Pub. Date: Jan. 11, 2007

(65) Prior Publication Data
US 2009/0166117 A1 Jul. 2, 2009

(30) Foreign Application Priority Data

Jul. 5, 2005 (JP) ................................. 2005-196829

(51) Int. Cl.
*B62D 23/00* (2006.01)
(52) U.S. Cl. ........................ 180/89.1; 180/9.1; 180/89.12
(58) Field of Classification Search ................. 180/89.1, 180/89.14, 367, 327, 329, 9.1, 89.12, 89.17, 180/89.13, 69.21; 280/759, 834, 756; 296/190.01, 296/190.05, 193.12, 190.08
See application file for complete search history.

(56) References Cited

U.S. PATENT DOCUMENTS

| | | | | |
|---|---|---|---|---|
| 5,711,095 A | * | 1/1998 | Oda et al. ...................... | 180/327 |
| 6,290,009 B1 | * | 9/2001 | Kondo et al. .................. | 180/9.1 |
| 6,729,831 B1 | * | 5/2004 | Kawamura et al. ........... | 414/694 |
| 7,131,687 B2 | * | 11/2006 | Yokoo et al. ............. | 296/190.08 |
| 7,188,865 B2 | * | 3/2007 | Sugiyama et al. ............ | 280/759 |
| 7,287,810 B2 | * | 10/2007 | Ishii et al. ................ | 296/190.05 |
| 7,374,208 B2 | * | 5/2008 | Yamamoto et al. ........... | 280/834 |
| 7,559,601 B2 | * | 7/2009 | Ishii et al. ................ | 296/190.08 |
| 7,673,931 B2 | * | 3/2010 | Takano et al. ............ | 296/190.01 |
| 2007/0267244 A1 | * | 11/2007 | Sakamoto ..................... | 180/367 |
| 2008/0067836 A1 | * | 3/2008 | Takano et al. ............ | 296/193.12 |

(Continued)

FOREIGN PATENT DOCUMENTS

EP 1 754 835 A 2/2007

(Continued)

OTHER PUBLICATIONS

Supplementary European Search Report for European Application No. EP 06 71 1982, European Patent Office, mailed Nov. 7, 2008, 2 pgs.

*Primary Examiner* — Hau V Phan
(74) *Attorney, Agent, or Firm* — Sterne, Kessler, Goldstein & Fox P.L.L.C.

(57) ABSTRACT

A canopy installation member for installing a canopy is firmly fixed on a rotation table frame. A rotary working machine having a working machine installed at the front of a rotation table frame (5), an engine (8) mounted on the rotation table frame (5), and a canopy detachably installed at the rear of the rotation table frame (5), wherein the engine (8) is placed and fixed on the rotation table frame (5) with a horizontally placed frame-like engine support member (31a, 31b) interposed between the engine and the frame, and a canopy installation member (32a, 32c) is raised at one side of the engine support member (31a, 31b).

8 Claims, 26 Drawing Sheets

U.S. PATENT DOCUMENTS

2008/0191516 A1* 8/2008 Ayabe et al. ............. 296/190.05
2008/0250917 A1* 10/2008 Yamashita ..................... 91/171

FOREIGN PATENT DOCUMENTS

| | | |
|---|---|---|
| JP | 06-212666 | 8/1994 |
| JP | 10-331195 | 12/1998 |
| JP | 2000-038037 | 2/2000 |
| JP | 2000 309946 A | 11/2000 |
| JP | 2001-63638 | 3/2001 |
| JP | 2001-090119 | 4/2001 |
| JP | 2004-300675 | 10/2004 |

* cited by examiner

ROTARY WORKING MACHINE

BACKGROUND OF THE INVENTION

1. Field of the Invention

The present invention relates to an attachment structure of a canopy covering a drive operation unit of a rotary working machine.

2. Background Art

Conventionally, in a rotary working machine such as a power shovel, a rotation table frame is generally arranged on a traveling device; a working machine including a boom and arm and an attachment such as a bucket is attached to the front part of the rotation table frame; and an engine, a counterweight, and the like are arranged at the back part of the rotation table frame. Furthermore, a canopy installation member is arranged at the back part of the rotation table frame, and a canopy is attached to the canopy installation member (see e.g., Patent Document 1).

In the rotary working machine as in the prior art, the canopy installation member includes a plate for attaching a canopy and left and right frames for supporting the plate, where the left and right frames are arranged in an upstanding manner on the rotation table frame, and thus lacks in stability on the rotation table frame.

[Patent Document 1] Japanese Laid-Open Patent Publication No. 2001-63638

BRIEF SUMMARY OF THE INVENTION

Problem to be Solved by the Invention

The problem to be solved is to firmly fix the canopy installation member for installing the canopy on the rotation table frame.

Means for Solving the Problem

The rotary working machine of the present invention relates to a rotary working machine in which a working machine is attached at a front part of a rotation table frame, an engine is mounted on the rotation table frame, and a canopy is detachably installed at a rear of the rotation table frame; wherein the engine is placed and fixed on the rotation table frame with a horizontally placed frame-like engine support member; and a canopy installation member is integrally formed and raised at one side of the engine support member.

In the rotary working machine of the present invention, a battery mounting base is fixed to the canopy installation member, and a battery is attached with the engine.

In the rotary working machine of the present invention, a radiator is attached to the canopy installation member.

In the rotary working machine of the present invention, an air cleaner is attached to the canopy installation member.

In the rotary working machine of the present invention, a reinforcement member is arranged between the canopy installation member and the engine support member.

In the rotary working machine of the present invention, a muffler is attached to the reinforcement member.

EFFECTS OF THE INVENTION

In the rotary working machine of the present invention, since the engine is placed and fixed on the rotation table frame with a horizontally placed frame-like engine support member; and a canopy installation member is integrally formed and raised at one side of the engine support member in the rotary working machine in which a working machine is attached at a front part of a rotation table frame, an engine is mounted on the rotation table frame, and a canopy is detachably installed at a rear of the rotation table frame, the canopy installation member and the engine support member are integrally fixed, and can be firmly fixed compared to when the canopy installation member is fixed on the rotation table frame in a single body. The canopy installation member and the engine support member can be assembled on the rotation table frame while being installed with various equipments, whereby the assembling performance as a module can be enhanced. Furthermore, the performance can be checked before attaching various equipments to the periphery of the engine and assembling to the main equipment.

In the rotary working machine of the present invention, a battery mounting base is fixed to the canopy installation member, and a battery is attached with the engine, and thus can be easily assembled without the rotation table frame or the bonnet being a hindrance, and the assembly performance is enhanced.

In the rotary working machine of the present invention, a radiator is attached to the canopy installation member, and thus can be easily assembled without the rotation table frame or the bonnet being a hindrance, and the assembly performance is thus enhanced.

In the rotary working machine of the present invention, an air cleaner is attached to the canopy installation member, and thus can be easily assembled without the rotation table frame or the bonnet being a hindrance, and the assembly performance is thus enhanced.

In the rotary working machine of the present invention, a reinforcement member is arranged between the canopy installation member and the engine support member, and thus the canopy installation member can be firmly fixed on the engine support member.

In the rotary working machine of the present invention, a muffler is attached to the reinforcement member, and thus the space around the engine can be efficiently used.

BRIEF DESCRIPTION OF TINE DRAWINGS

DETAILED DESCRIPTION OF THE INVENTION

Figure 1:
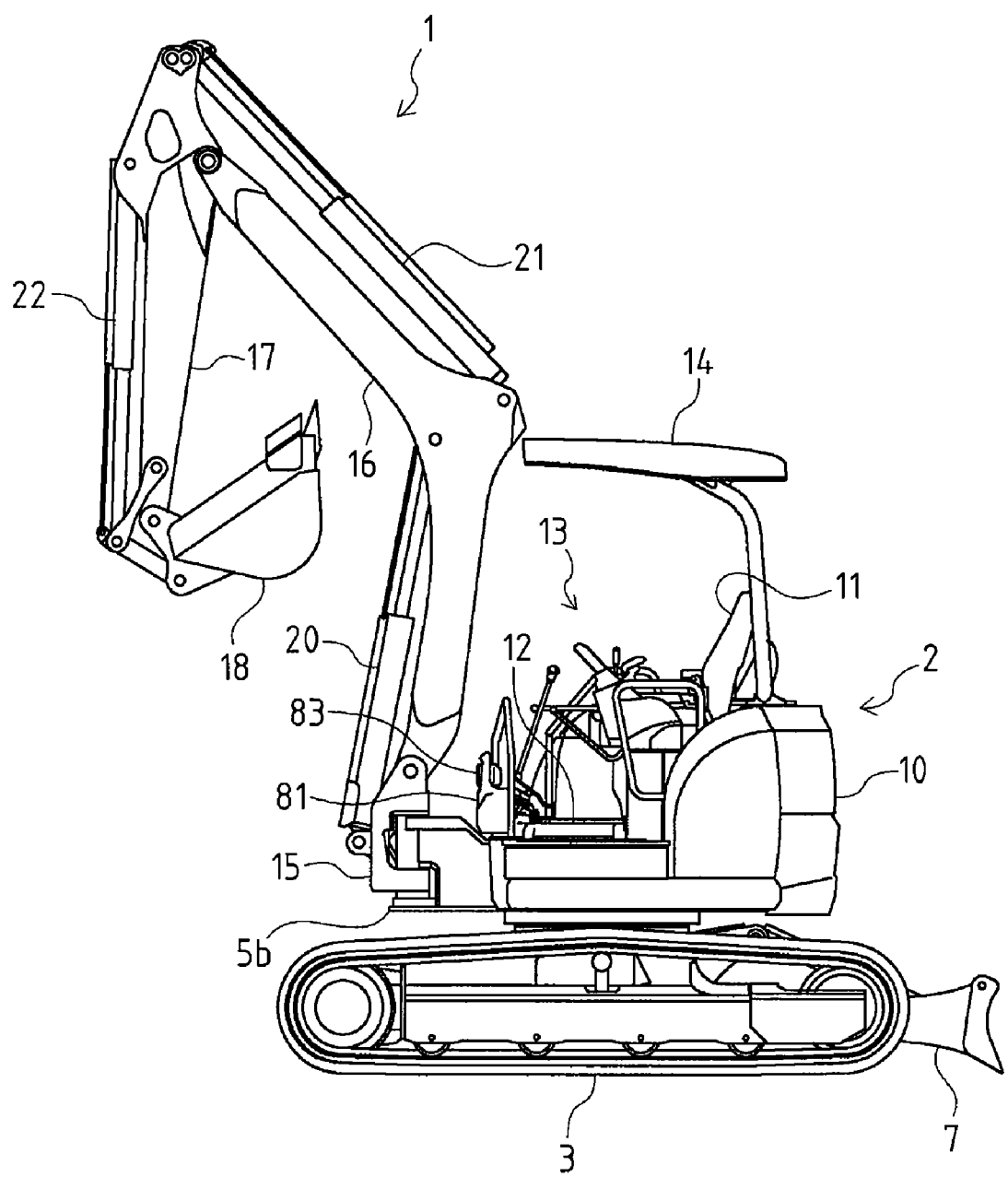
FIG. 1 is a left side view of a rear ultraminiature rotary type rotary working machine according to one example of the present invention.
Figure 2:
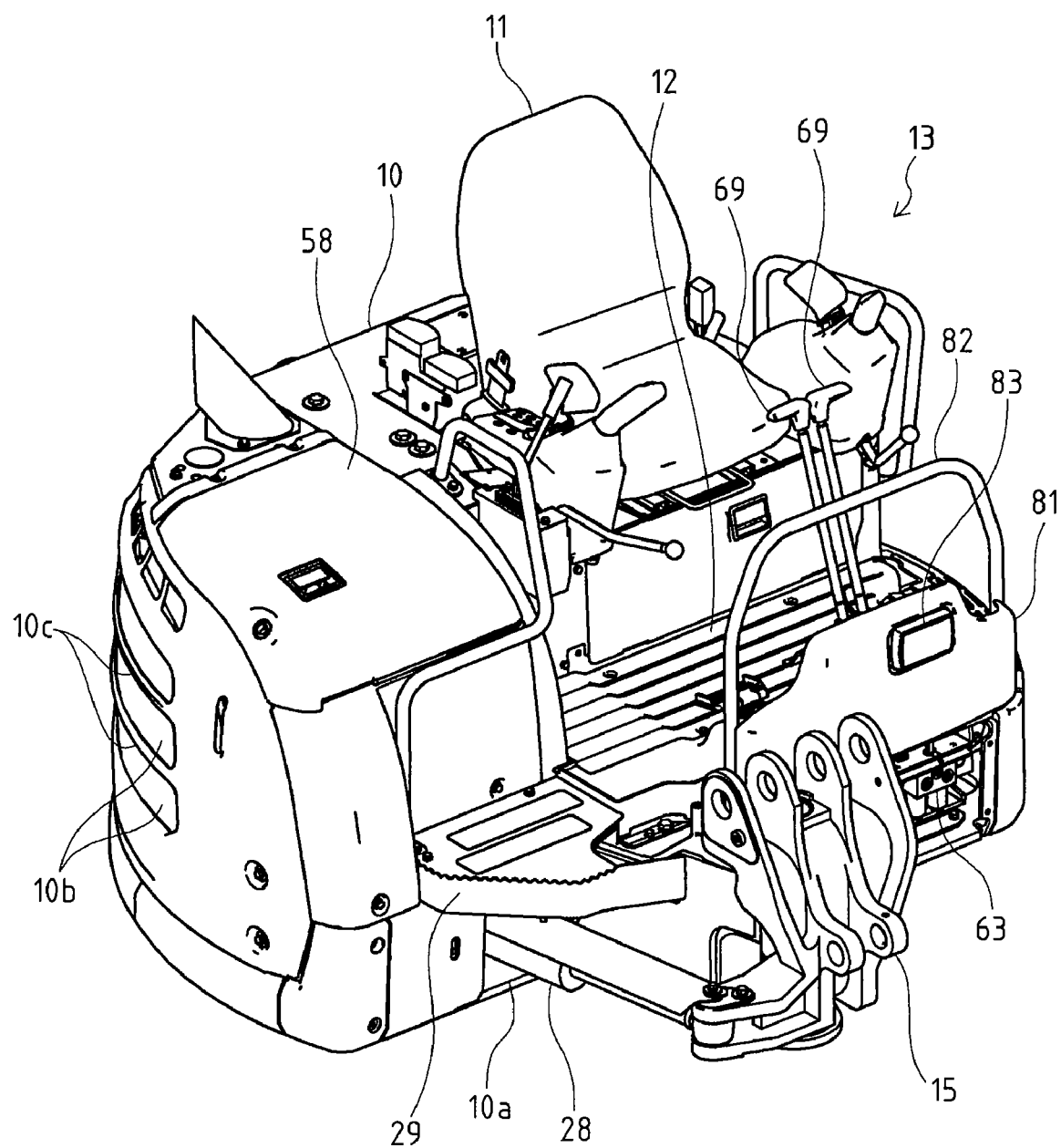
FIG. 2 is a perspective view of a main equipment of the rotary working machine.
Figure 3:
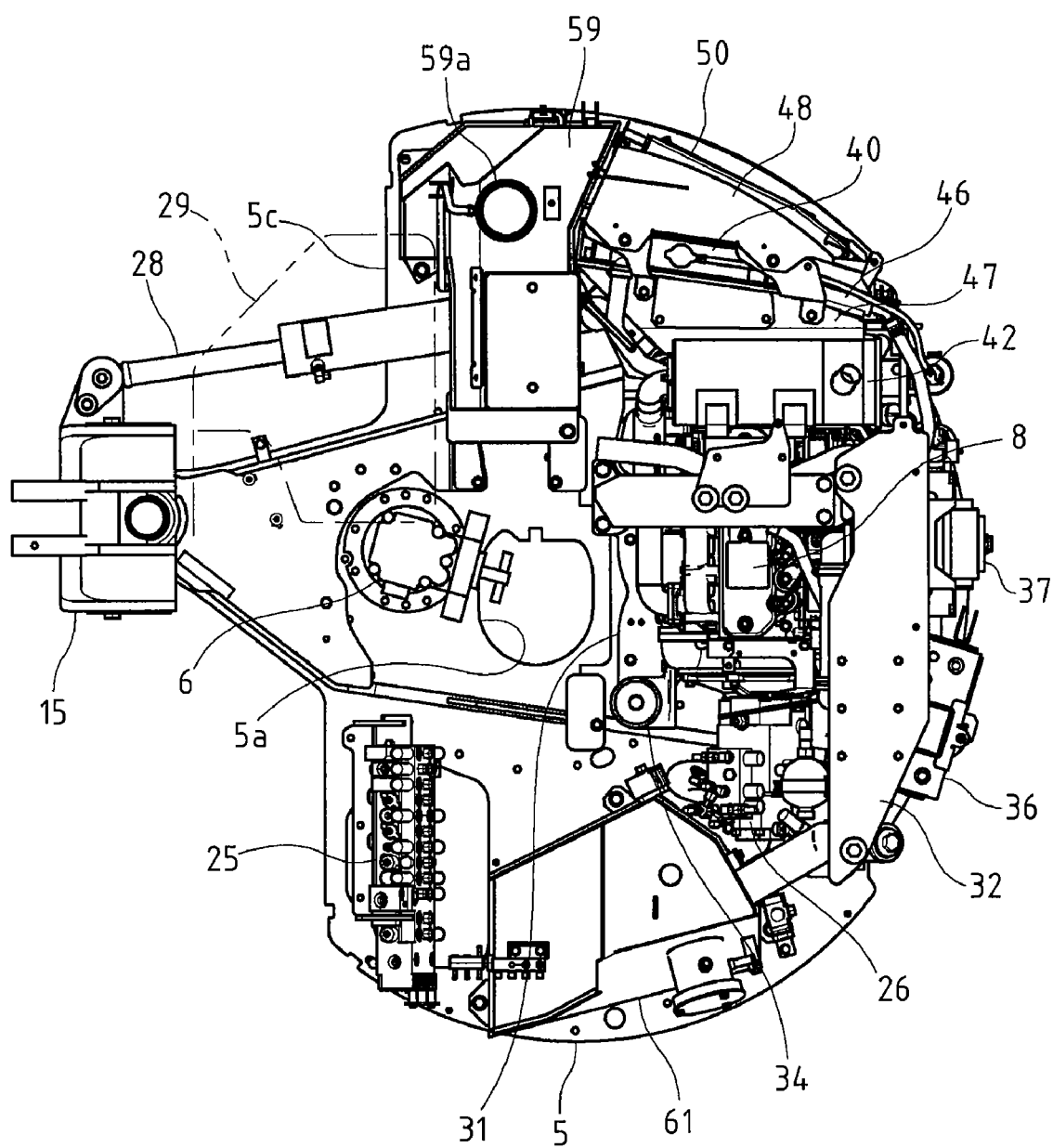
FIG. 3 is a plan view showing an arrangement structure of a rotation table frame.
Figure 4:
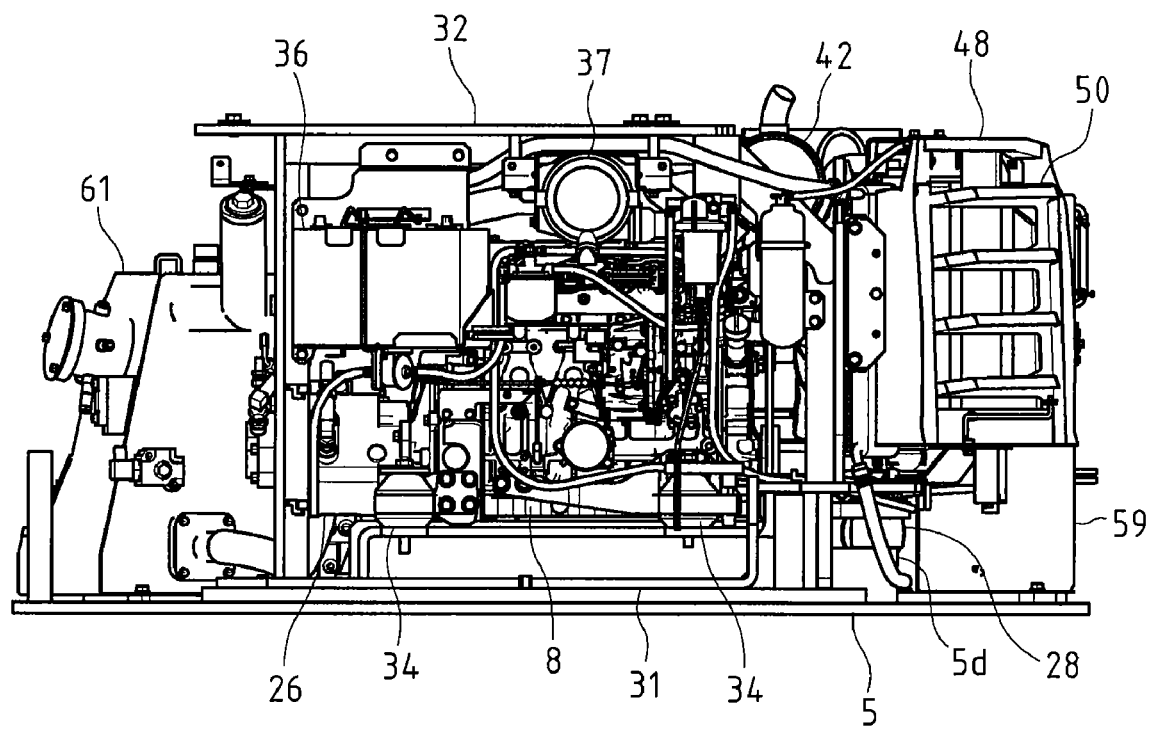
FIG. 4 is a rear view showing an arrangement structure of the rotation table frame.
Figure 5:
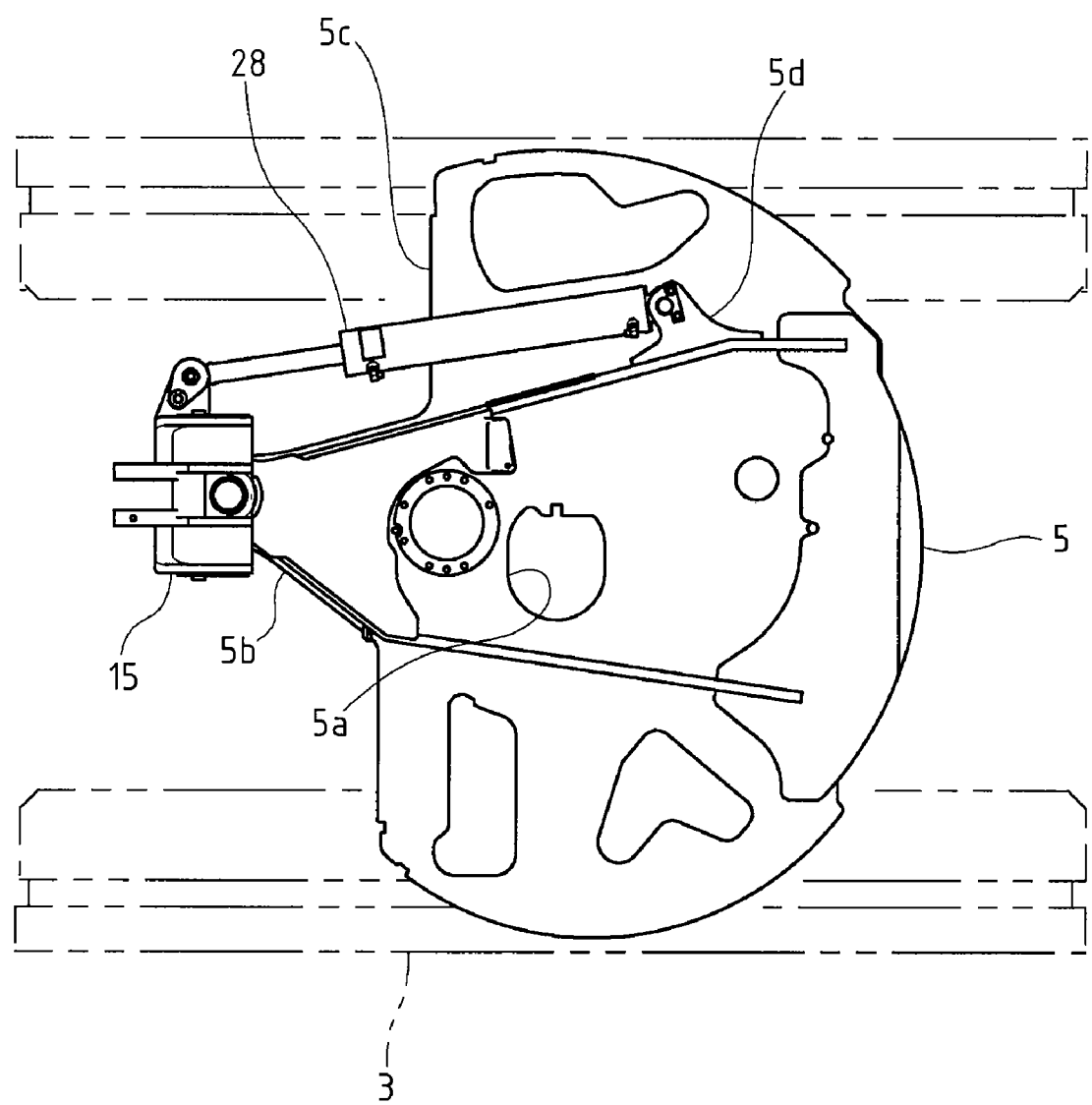
FIG. 5 is a plan view of the rotation table frame.
Figure 6:
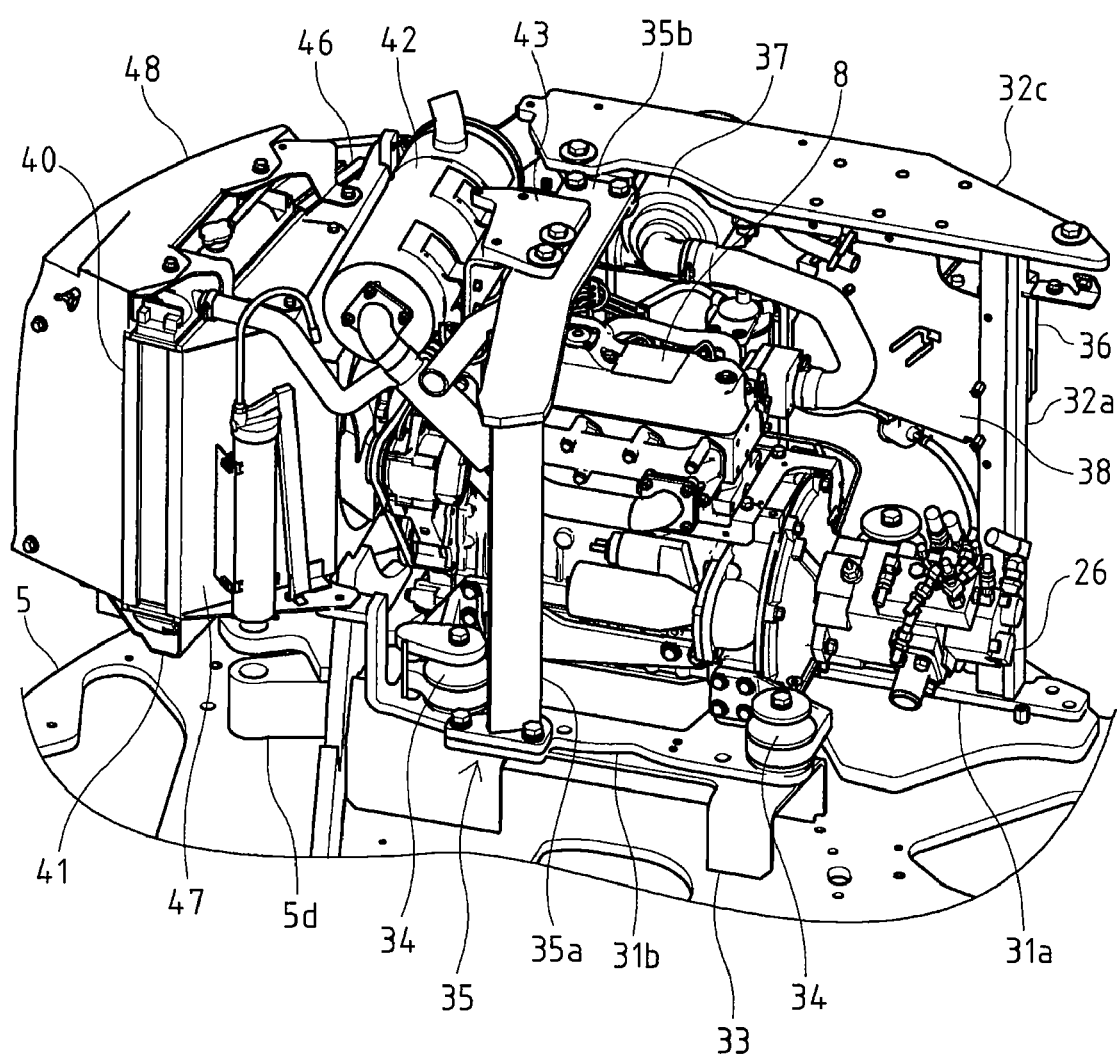
FIG. 6 is a front perspective view of an engine supporting part.

As shown in FIG. 1, FIG. 2, and FIG. 3, in a rear ultraminiature rotary type power shovel in which a rotary working machine such as working machine 1 is attached at the middle in the left and right direction of the front part of a main equipment 2, a rotation table frame 5 is supported in a left and right rotatable manner by way of a rotary base bearing at the middle of the upper part of a crawler traveling device 3, and a rotary motor 6 is arranged on the rotation table frame 5. A blade 7 is arranged in a freely up and down turning manner on either the front or the rear side of the crawler traveling device 3. A bonnet 10 for covering an engine 8 etc. is arranged on the upper part of the rotation table frame 5, and a driver's seat 11 is arranged on the bonnet 10 or on the front side of the bonnet 10. An operation lever, a lock lever, and the like are arranged near the driver's seat 11, and a travel lever and a pedal are arranged on a step 12 on the front side of the driver's seat 11 thereby configuring a drive operation unit 13. A canopy 14 or a cabin is arranged above the drive operation unit 13.

A boom bracket 15 is attached in a left and right turning manner at the middle in the left and right direction of the front end of the rotation table frame 5, and a lower end of a boom 16 is supported in the up and down (front and back) turning manner by the boom bracket 15. The boom 16 is bent towards the front side at the middle to be formed to a substantially dogleg shape in side view. A rear end of an arm 17 is supported in a front and back turning manner at the upper end of the boom 16, and a bucket 18 which is a work attachment, is supported in a freely front and back turning manner at the front end of the arm 17. A boom turning boom cylinder 20 is interposed between the front part of the boom bracket 15 and the front part of the middle part of the boom 16, an arm turning arm cylinder 21 is interposed between a rear surface of the middle part of the boom 16 and a stay arranged at the rear end of the arm 17, and a bucket turning bucket cylinder 22 is interposed between the stay at the rear part of the arm 17 and the bucket 18. The boom 16, the arm 17, the bucket 18, and each cylinder 21, 22, 23 configure the working machine 1.

In the working machine 1, the boom 16 can be turned by an extension drive of the boom cylinder 20, the arm 17 can be turned by an extension drive of the arm cylinder 21, and the bucket 18 can be turned by an extension drive of the bucket cylinder 22. In the main equipment 2, the rotation table frame 5 on the crawler traveling device 3 is rotatable by the rotation drive of the rotary motor 6. The cylinders 21, 22, 23, which are hydraulic actuators, and the rotary motor 6 are configured so as to be driven by a pressurized supply of oil through a hydraulic hose from a hydraulic pump 26 arranged on the rotation table frame 5 when a control valve 25 is switched through a turning operation of the operation lever, pedal, or the like arranged on the drive operation unit 13.

As shown in FIG. 2 to FIG. 5, an opening 5a for arranging a rotary base bearing is formed at the middle in the front and back, and left and right directions of the rotation table frame 5, where the center serves as the center of rotation of the main equipment 2. The rear part of the rotation table frame 5 is formed so that an outer peripheral shape has a semicircular (substantially ⅗ circle) shape with the center of rotation as the center in plan view, where the radius of the semicircular portion is substantially the same as the radius of the rotation trajectory of the rear end of the rotation table frame 5. In other words, the distance from the center of rotation to the circular arc portion is assumed as the radius of the rotation trajectory of the substantially circular shape drawn by the rear part of the rotation table frame. The rotation table frame 5 has the left and right width substantially matching the left and right width of the crawler traveling device 3, and is configured to be rotatable by the drive of the rotary motor 6 arranged in the vicinity of the opening 5a on the crawler traveling device 3.

The front part of the rotation table frame 5 is cut to a straight line in the left and the right direction so that the outer peripheral shape has a linear shape. A boom bracket attachment part 5b for attaching the boom bracket 15 configured to a substantially triangular shape in plan view is arranged so as to project towards the front side at the middle in the left and the right direction of the linear part, and is arranged so that the boom bracket 15 for attaching the working machine 1 is positioned within the rotation radius at the front part of the boom bracket attachment part 5b. The drive operation unit 13 is arranged on the left side of the rotation table frame 5, the bonnet 10 is arranged on the right side and the rear part so as to lie along the outer peripheral shape of the rotation table frame 5, and the engine 8, the hydraulic pump 26, the fuel tank, the hydraulic fluid tank, the radiator and the like are accommodated in the bonnet.

Furthermore, a step difference part 5c depressed towards the rear side is arranged on either the left or the right side at the front part of the rotation table frame 5, or in the present example, the right side which is on the symmetrically opposite side with respect to the drive operation unit 13. The front surface of the step difference part 5c extends in the left and right direction. An opening 10a is formed on the upper side of the front surface of the step difference part 5c, and a swing cylinder 28 is arranged so as to project towards the boom bracket 15 from the opening 10a. The swing cylinder 28 has the rear end pivotally supported in a freely turning manner by a pivot supporting part 5d arranged on the rotation table frame 5 and the front end connected to the boom bracket 15, so that the boom bracket 15 can turn to the left and the right with respect to the rotation table frame 5 by the extension drive.

Furthermore, a second step 29 is arranged on the upper side of the step difference part 5c of the rotation table frame 5 so as to hide the step difference part 5c and the opening 10a and cover the upper front part of a cylinder tube of the swing cylinder 28, and to be positioned within the rotation radius. The second step 29 having a substantially triangular shape in plan view is detachably fixed to the front part of the bonnet 10, and is arranged so that the height of the upper surface coincides continuously in the left and right direction with the step 12 arranged at the front part of the drive operation unit 13. A walk through space opening in the left and right direction is thereby formed on the upper side of the step 12 and the second step 29, whereby a workable range in the main equipment 2 is enlarged by the walk through space and workability is improved. The hydraulic hose is collectively extended towards each cylinder 20, 21, 22 arranged in the working machine 1 from the opening 10a on the lower side of the second step 29, whereby maintenance is easily carried out by removing the second step 29.

On the rotation table frame 5 covered with the bonnet 10, a supporting body 30 integrally configured with an engine support member 31 for supporting the engine 8 arranged in the left and right direction on the rotation table frame 5 and a canopy installation member 32 for installing the canopy 14 is fixedly arranged on the rotation table frame 5, as shown in FIG. 6 to FIG. 9. The supporting body 30 is configured to a substantially L-shape in plan view.

Figure 9:
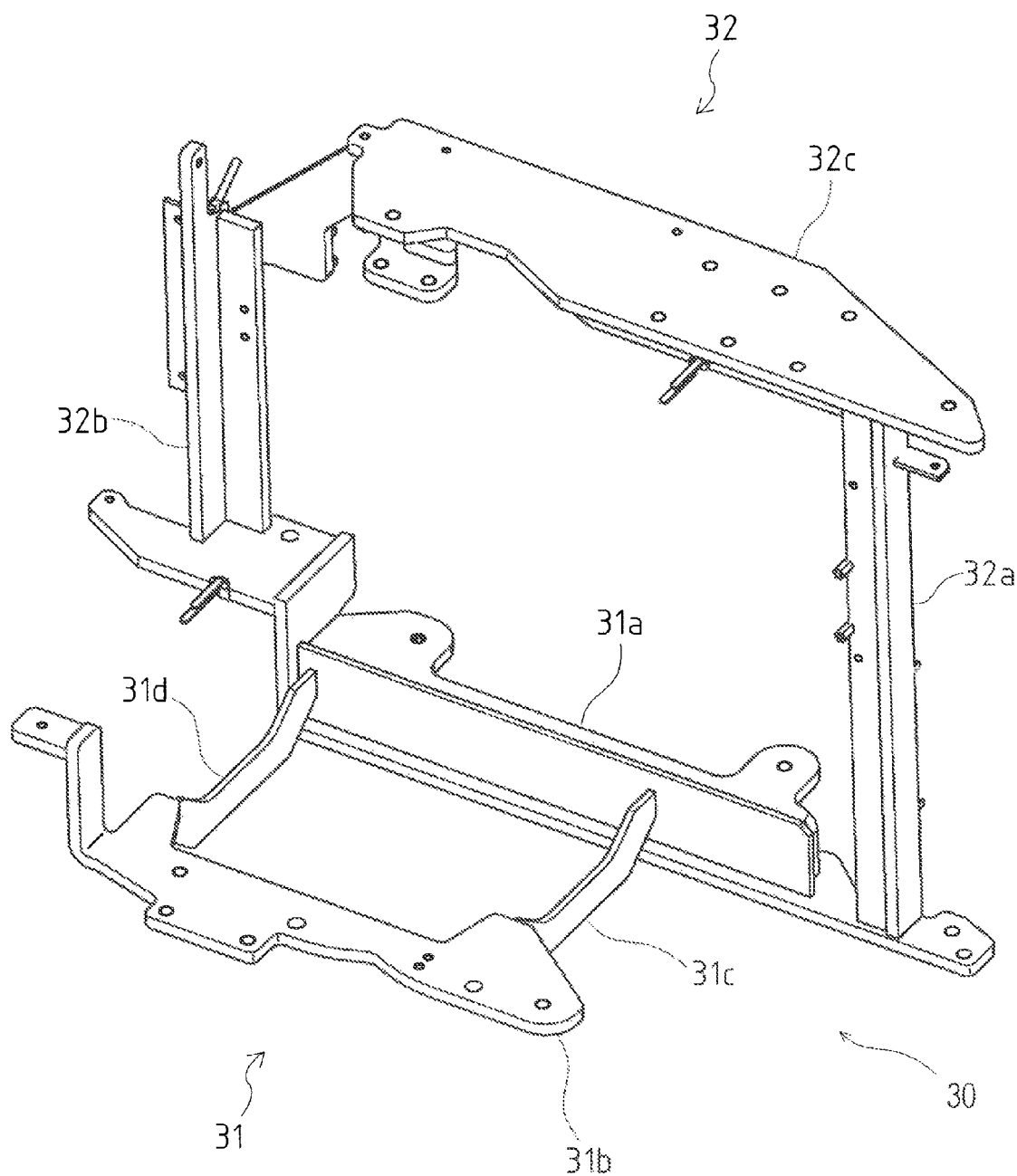
FIG. 9 is a perspective view of the engine supporting part.

As shown in FIG. 9, the engine support member 31 includes a back frame 31a and a front frame 31b arranged parallel on the front and the back in the left and right direction, and frames 31c, 31d arranged parallel on the left and the right in the front and back direction, where the frames 31a, 31b, 31c, 31d are arranged in a horizontal direction and configure a frame shape. The back frame 31a is directly fixed and arranged on the rotation table frame 5, and the front frame 31b is fixedly arranged on the rotation table frame 5 by way of a bracket 33 folded to a reverse U-shape in side view. The left and right frames 31c and 31d configured to a ship bottom shape in side view are transversely arranged at an appropriate spacing between the back frame 31a and the front frame 31b. The engine 8 is supported on the back frame 31a and the front frame 31b of the engine support member 31 by way of a vibration absorption member 34, and the canopy installation member 32 is raised at the back frame 31a.

The canopy installation member 32 includes column shaped left and right frames 32a, 32b and a plate shaped canopy installation plate 32c, where the left and right frames 32a, 32b are fixedly arranged so as to project to the upper side from both left and right sides of the back frame 31a of the engine support member 31, and the canopy installation plate 32c is transversely arranged between the upper ends of the left and right frames 32a, 32b. The canopy installation member 32 is thereby integrally formed with the engine support member 31 and fixed on the rotation table frame 5 with a bolt etc., and thus tilt or vibration in the front and back direction can be reduced compared to when fixedly arranged on the rotation table frame 5 alone. That is, since a heavy engine is mounted on the engine support member 31, the canopy installation member 32 is less likely to tilt towards the rear side and the tilt towards the front side is inhibited by the engine support member 31, and thus is stably supported on the rotation table frame 5. The canopy installation plate 32c is arranged on the rear side of the driver's seat 11 of the drive operation unit 13, and the canopy 14 is attached and fixed on the canopy installation plate 32c.

Furthermore, a reinforcement member 35 is connected between the upper part of the canopy installation member 32 and the front part of the engine support member 31 to reinforce the supporting body 30. That is, the reinforcement member 35 is configured by forming the plate to a substantially reverse L-shape in side view, arranged so as to surround the upper front side of the engine 8, connected to the front frame 31b of the engine support member 31 at the lower part of a vertical part 35a, and connected to the canopy installation plate 32c of the canopy installation member 32 at the rear part of a horizontal part 35b. The canopy installation member 32 and the engine support member 31 are formed to a frame shape in side view and firmly fixed by the reinforcement member 35.

Thus, the canopy installation member 32 and the engine support member 31 are integrally fixed on the rotation table frame 5, and the canopy installation member 32 can be firmly fixed and stabilized compared to when the canopy installation member 32 is fixed alone on the rotation table frame 5. The canopy installation member 32 and the engine support member 31 can be assembled to the rotation table frame 5 with various equipments attached to the canopy installation member 32 and the engine support member 31, whereby the assembling performance as a module can be improved.

An equipment to be attached to a supporting body 30 integrally configured by the canopy installation member 32 and the engine support member 31 includes a battery 36, an air cleaner 37, a radiator 40, and the like. The battery 36 is supported and fixed on a battery mounting base 38 attached to the left frame 32a of the canopy installation member 32, and is arranged on the rear side of the upper left part of the engine 8. The air cleaner 37 is attached to the bottom surface of the canopy installation plate 32c by way of a stay 39 and the like, and is arranged on the upper rear side of the middle part in the left and right direction of the engine 8. The radiator 40 is supported on a radiator supporting base 41 attached to the right end of the back frame 31a and the front frame 31b of the engine support member 31, and is arranged on the right side of the engine 8. The hydraulic hose and harness are additionally attached to the canopy installation member 32, so that vibration and entanglement are prevented.

A muffler 42 is attached to the reinforcement member 35. The muffler 42 is attached by way of a stay 43 attached to the horizontal part 35b of the reinforcement member 35, and is arranged in the front and back direction at the upper side of the engine 8. As various equipment can be attached to the supporting body 30, the engine 8 is attached to the supporting body 30 and then various equipment such as the battery 36 or the air cleaner 37, the radiator 40, and the muffler 42 are attached to the canopy installation member 32 and the reinforcement member 35 from the front and back and left and right periphery of the engine before attaching to the rotation table frame 5, whereby assembly task can be performed with tools and hands brought closer to each part, and the assembly task can be reliably and easily performed.

Figure 7:
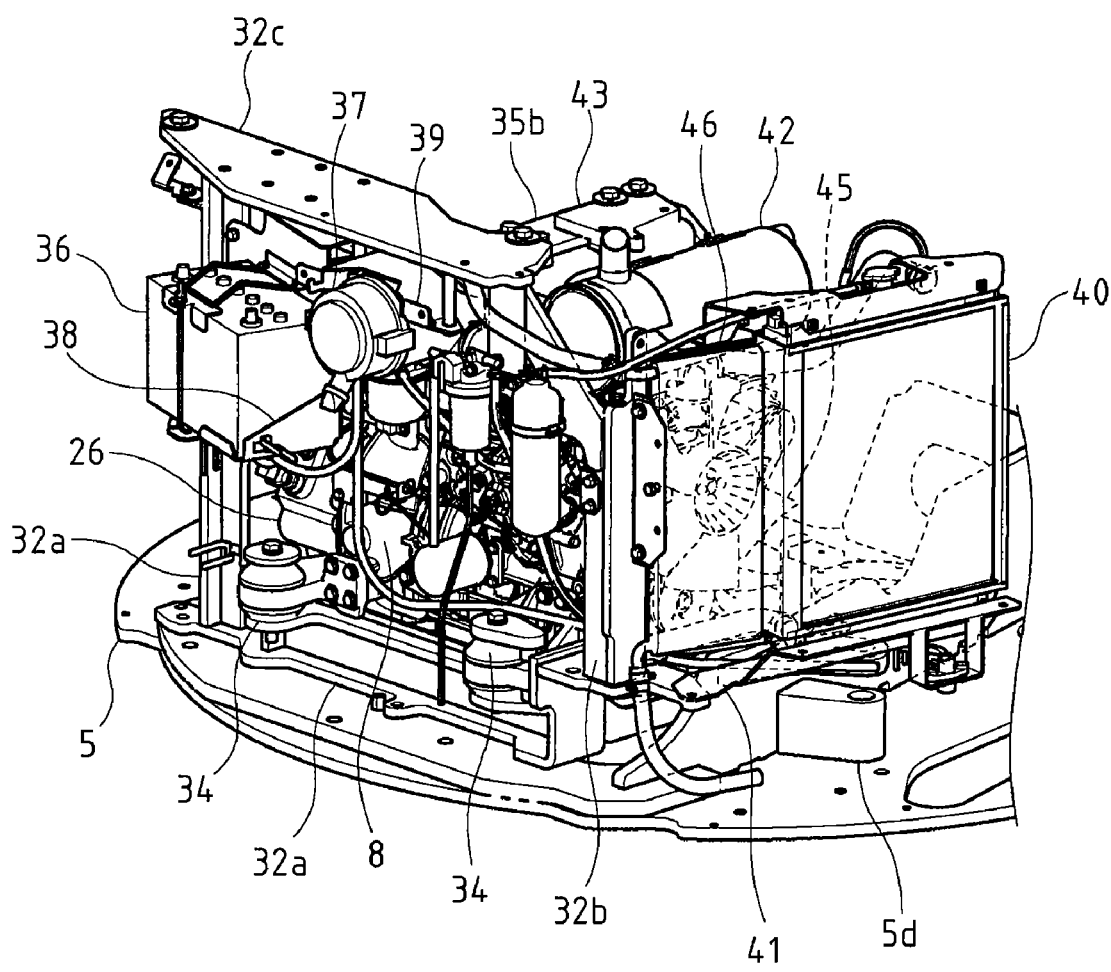
FIG. 7 is a rear perspective view of the engine supporting part.
Figure 8:
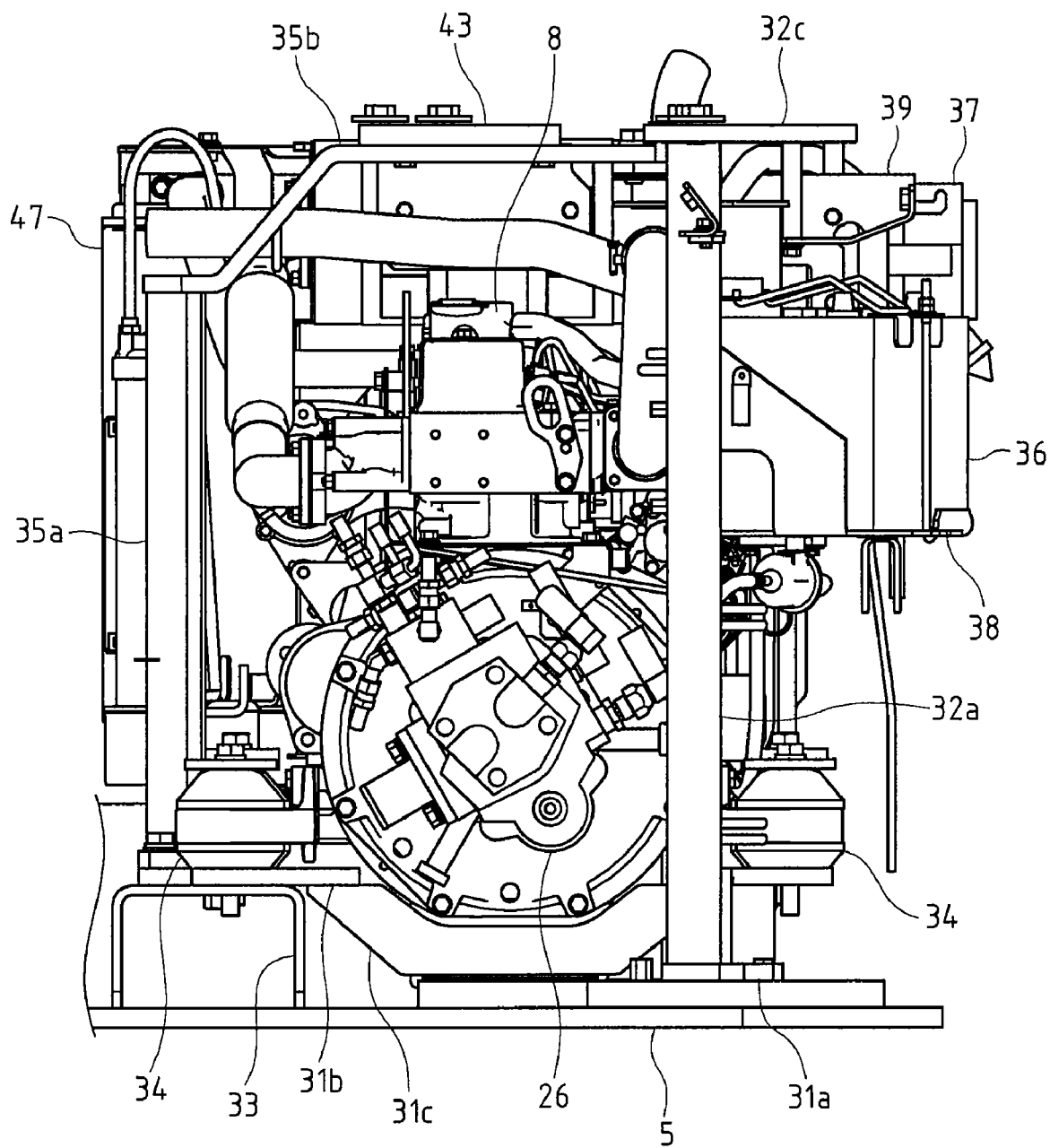
FIG. 8 is a left side view of the engine supporting part.

As shown in FIG. 3, the engine 8 supported on the engine support member 31 is arranged so that a crank shaft lies in the left and right direction of the equipment body. A cooling fan 45 is arranged on the right side of the engine 8, and is drivable through a belt and a pulley by the engine 8. As shown in FIG. 7, the radiator 40 and the oil cooler 46 are continuously arranged in the front and the back direction on the right side of the cooling fan 45, and are arranged so as to be lined without overlapping in side view and so that the front end faces the outer direction. A shroud 47 is arranged between the radiator 40 and oil cooler 46 and the cooling fan 45, and a substantially triangular space is formed in plan view in the shroud 47. The cooling airflow produced by the rotation of the cooling fan 45 thereby passes through a space in the shroud 47 and simultaneously hits the radiator 40 and the oil cooler 46 to cool the same.

Figure 10:
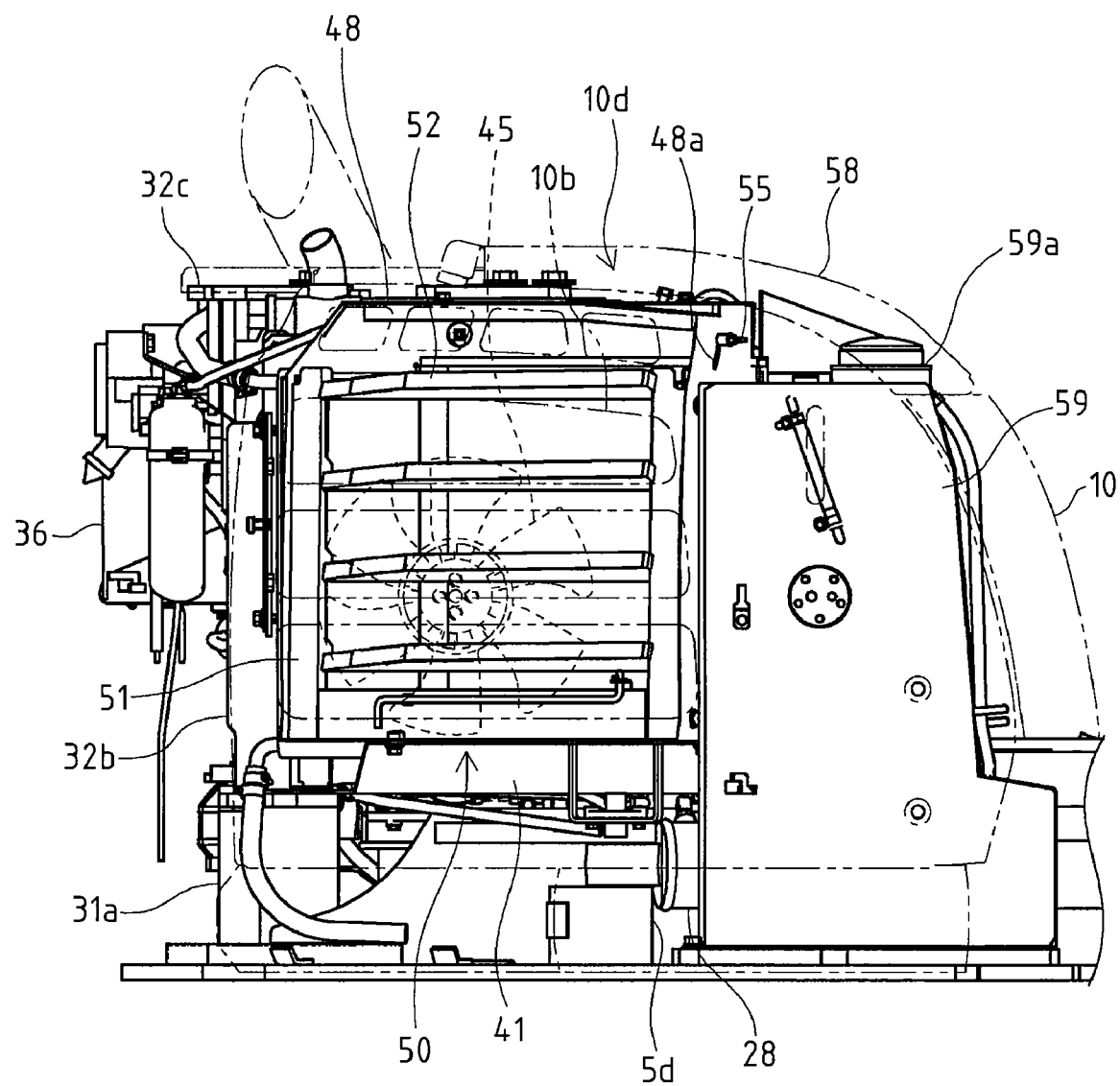
FIG. 10 is a right side view showing an arrangement structure of the rotation table frame.

As shown in FIG. 2 and FIG. 10, the radiator 40 and the oil cooler 46 are arranged with a predetermined spacing from the side wall of the bonnet 10 formed to a circular arc shape, and a duct 48 is arranged between the radiator 40 and oil cooler 46 and the side wall of the bonnet 10. An opening 10b is formed at a portion facing the radiator 40 and the oil cooler 46 at the side surface of the bonnet 10, so that the duct 48 communicates with the outside through the opening 10b, and the cooling airflow from the cooling fan 45 can be discharged to the outside from the duct 48 and the opening 10b. A cross rail 10c is bridged parallel in the up and down direction at the opening 10b and a mesh form member is arranged, whereby protection of the radiator 40 and the oil cooler 46 is achieved by the cross rail 10c and the mesh form member.

A movable louver 50 is arranged in the duct 48 between the radiator 40 and oil cooler 46 and the opening 10b formed at the side surface of the bonnet 10, so that the airflow direction of the cooling airflow can be changed when the cooling airflow from the cooling fan 45 is discharged to the outside from the opening 10b by the louver 50.

Figure 11:
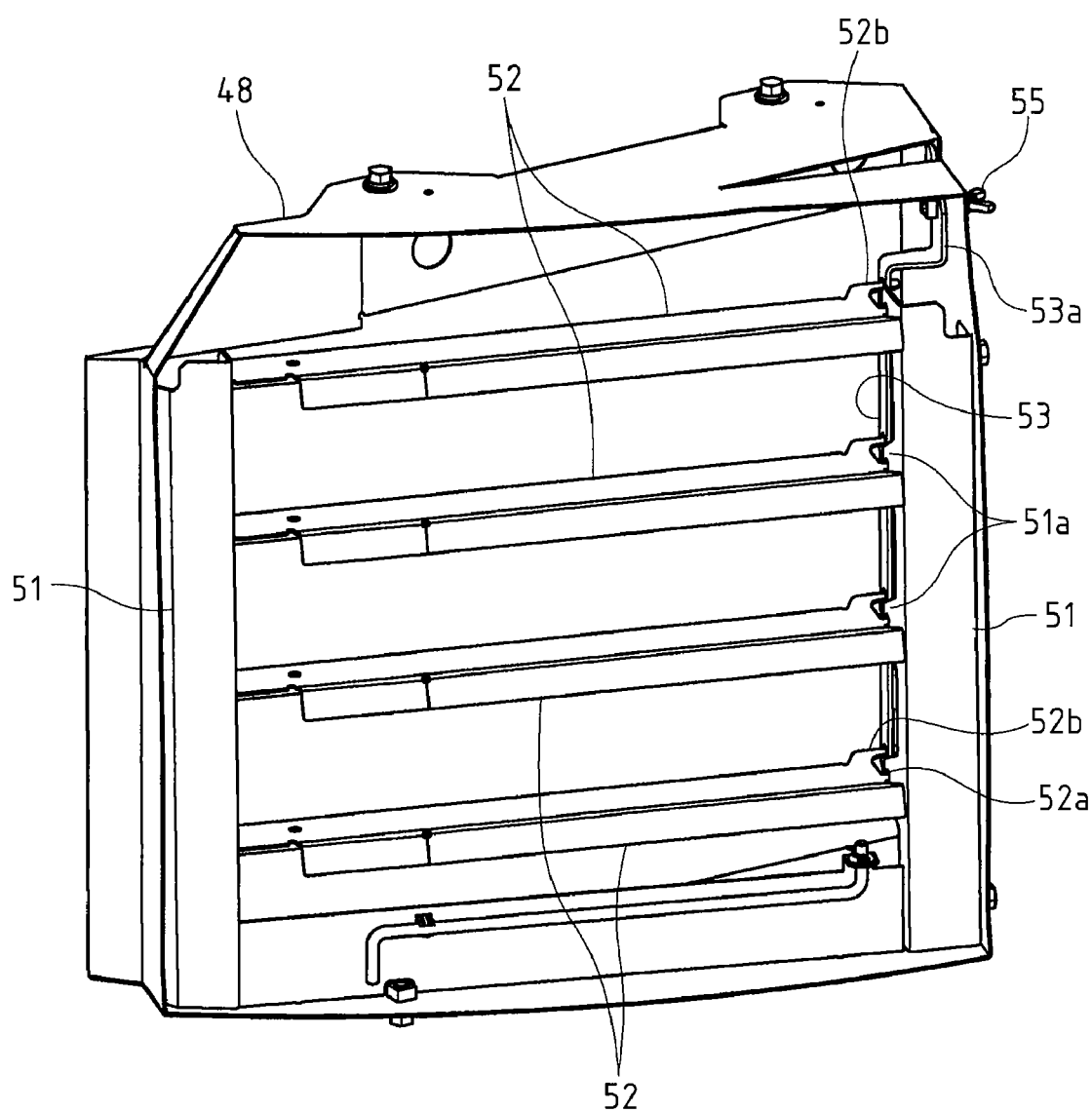
FIG. 11 is a side view of a louver.
Figure 12:
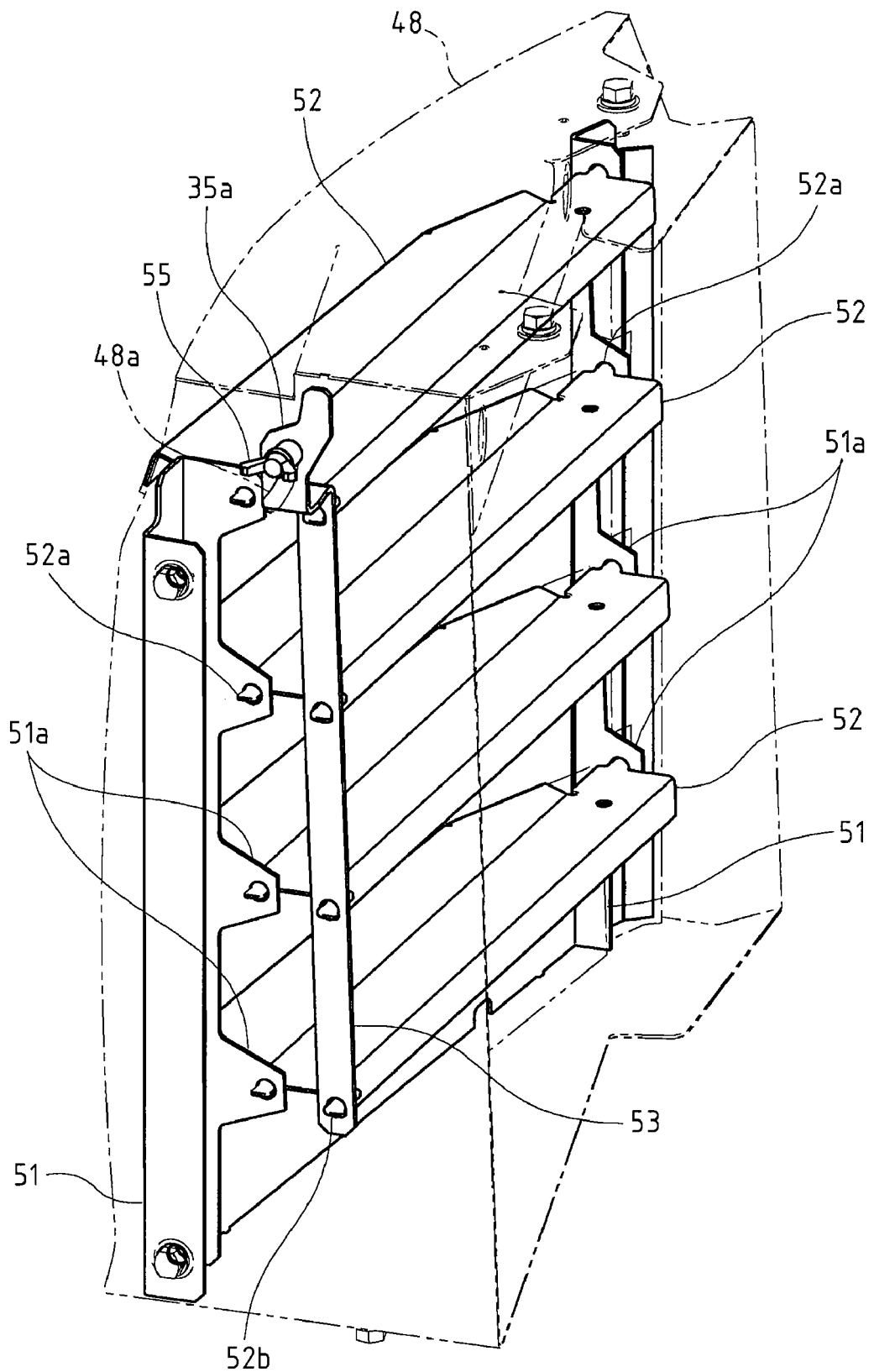
FIG. 12 is a perspective view of the louver.

As shown in FIG. 11 and FIG. 12, the louver 50 is configured from a pair of front and back side frames 51 fixedly arranged on the side wall of the duct 48; blades 52 arranged in plurals in the up and down direction between the side frames 51; a means for changing the angle of the blades 52; and a position fixing member of the angle. The blades 52 are bridged parallel in the up and down direction, and formed with shaft parts 52a projecting towards the side frames 51 from one end in the short side direction at both ends in the longitudinal direction of each blade 52. The shaft parts 52a are pivotally supported by bearing parts 51a arranged at a predetermined spacing in the up and down direction of each left and right side frames 51. The louver 50 is movably configured by supporting both sides of each blade 52 in a turning manner with the left and right side frames 51. The blade 52 has the outer side bent slightly towards the diagonally upward side, where the portion facing the oil cooler 46 has a narrow width and has a shape that lies along the side wall of the bonnet 10.

A pivotally supporting part 52b is arranged in a projecting manner parallel to the shaft part 52a from the other end in the short side direction at one end in the longitudinal direction of each blade 52, and the pivotally supporting part 52b is pivotally supported by a lever 53 arranged in the up and down direction parallel to the side frame 51. The lever 53 is then connected to the blades 52, so that the blades 52 can be turned in the same direction by moving the lever 53 in the up and down direction. The upper part of the lever 53 is extended to the upper side of the duct 48, and the upper end part 53a thereof is bent so as to contact the side wall of the duct 48. The position fixing member is arranged between the upper part of the lever 53 and the duct 48. That is, a bolt is projected to the side from the upper end part 53a of the lever 53.

A circular arc shaped long hole 48a is formed in the side wall of the duct 48 on the side of the upper end part 53a of the lever 53, the bolt is projected to the outside from the long hole 48a, a butterfly nut 55 is screw attached, and the butterfly nut 55 is tightened so that the lever 53 can be fixed at an arbitrary position to which it has been operated. The louver 50 thus can change and hold the blades 52 at an arbitrary angle. The fixing means of the lever 53 is not limited to a bolt and a nut, and may be a pin and the like, or the motor may be coupled to one of the shaft parts 52a to change the angle of the blades 52 with the motor, or the lever 53 may be coupled to a cylinder to change the angle of the blades 52 by extending the cylinder. Remote operation may be performed with an operation means in which an actuator such as motor or cylinder is arranged in the operation unit.

The louver 50 is thus configured to hold the blades 52 at an arbitrary angle by operating the lever 53 from above the duct 48. A state in which the outer side of the blade 52 is tilted and held towards the diagonally upper side when the nut 55 is positioned and tightened at the upper end of the long hole 48a formed in the side wall of the duct 48 to have the lever 53 at the upper most position is obtained, or the blade 52 may be held at a substantially horizontal state when the nut 55 is positioned and tightened at the lower end of the long hole 48a to fix the lever at the lower most position. The nut 55 can be positioned and fixed at an arbitrary position in the up and down direction of the long hole 48a.

Therefore, after the radiator 40 and the oil cooler 46 are cooled by the cooling airflow produced by the rotation of the cooling fan 45, the cooling airflow is discharged from the opening 10b formed in the bonnet 10, but the discharging direction of the cooling airflow can be angularly changed to the side or to the diagonally upper side of the main equipment according to the situation. Thus, the warmed cooling airflow is prevented from blowing against trees and walkers. For instance, if there are trees on the side of the main equipment, the cooling airflow can be discharged so as not to blow against the trees by changing the discharging direction of the cooling airflow to the diagonally upper side of the main equipment. The warmed cooling airflow sometimes blows against the operator on the drive operation unit 13 depending on the airflow direction when discharged to the upper side. In such case, the cooling airflow can be discharged to the side by being changed to a substantially horizontal direction, thereby preventing the warmed cooling airflow from blowing against the operator.

The nut 55 for adjusting the louver 50 is arranged on the lower side of the cover 58 covering the maintenance space 10d arranged on the front right part of the bonnet 10, as shown in FIG. 10. The cover 58 has the rear end pivotally supported by the equipment body, and is configured to turn in the up and down direction with the rear end as the center to be opened and closed. When the cover 58 is turned upward and opened, the nut 55 is exposed so that the nut 55 can be operated, whereby the angle adjustment of the blades 52 of the louver 50 can be easily and rapidly performed.

Figure 13:
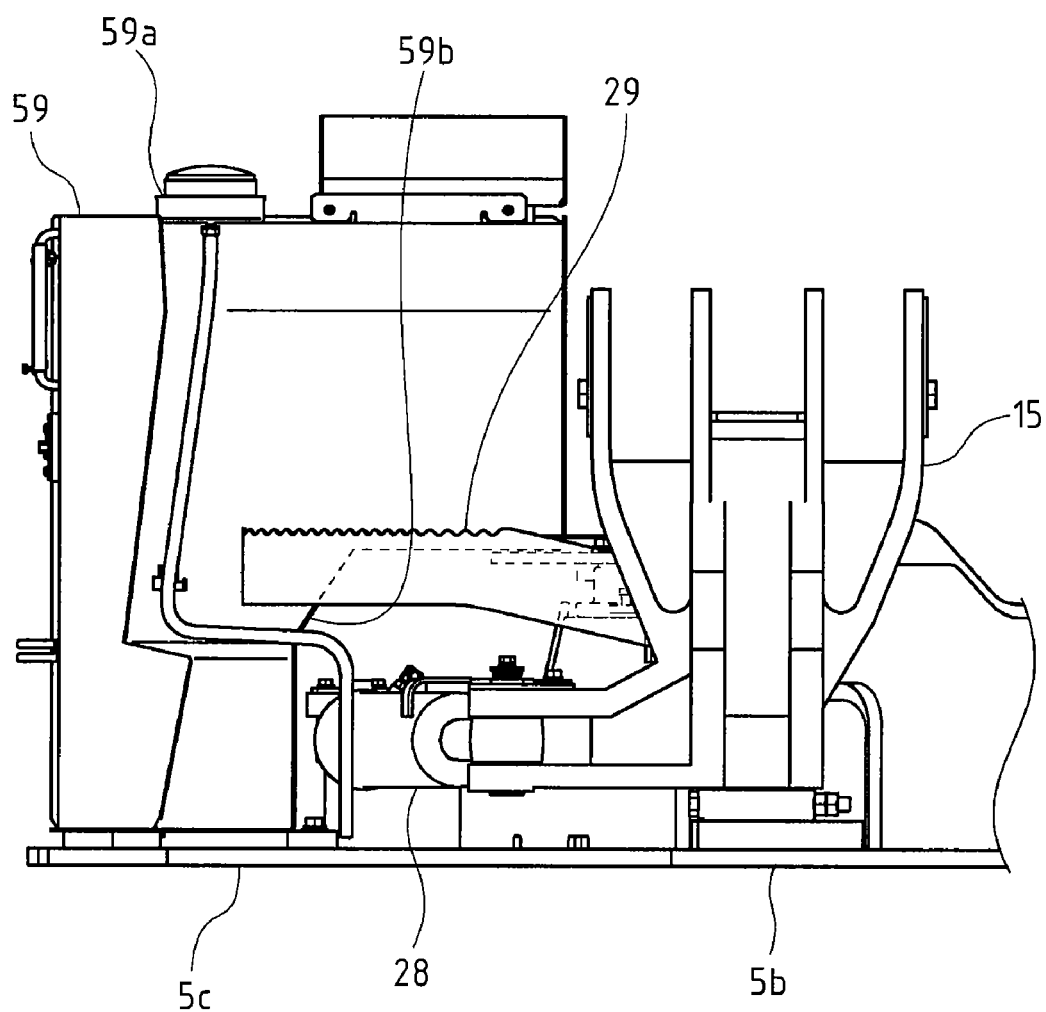
FIG. 13 is a front view showing an arrangement structure of the right side of a front part of the rotation table frame.

A fuel tank 59 is arranged on the front side of the radiator 40 and the louver 50. As shown in FIG. 10 and FIG. 13, the fuel tank 59 is mounted and fixed on the rotation table frame 5, and the upper part is covered with the cover 58. An oil supply port 59a is formed in the upper surface of the fuel tank 59, where the cover 58 is turned upward to be opened, so that oil can be supplied to the fuel tank 59 from the oil supply port 59a. The inner side in the left and right direction of the equipment body at the lower part of the fuel tank 59 has a cutout shape, and the swing cylinder 28 is arranged in the cutout part 59b. The fuel tank 59 has the lower end bulging out towards the side of the swing cylinder 28 to enlarge the capacity, and is arranged on the same left or right side of the swing cylinder 28 and the rotation table frame 5. A reservoir tank may be similarly configured and arranged in place of the fuel tank 59.

The second step 29 is arranged on the front side of the fuel tank 59, so that the worker can turn and open the cover 58 on the second step 29 to perform angle adjustment of the blade 52 of the louver 50 and to supply oil from the oil supply port 59a to the fuel tank 59.

The hydraulic pump 26 is arranged on the symmetrically opposite side with respect to the radiator 40 of the engine 8, and is drivable by the engine 8. As shown in FIG. 3, a reservoir tank 61 is arranged on the left side of the hydraulic pump 26, and the control valve 25 is arranged on the front side of the reservoir tank 61. The control valve 25 and the hydraulic pump 26, the reservoir tank 61 and control valve 25 and the rotary motor 6, the swing cylinder 28, and each cylinder 20, 21, 22 of the working machine 1 are connected with the hydraulic hose, and the hydraulic oil is supplied from the reservoir tank 61.

Figure 14:
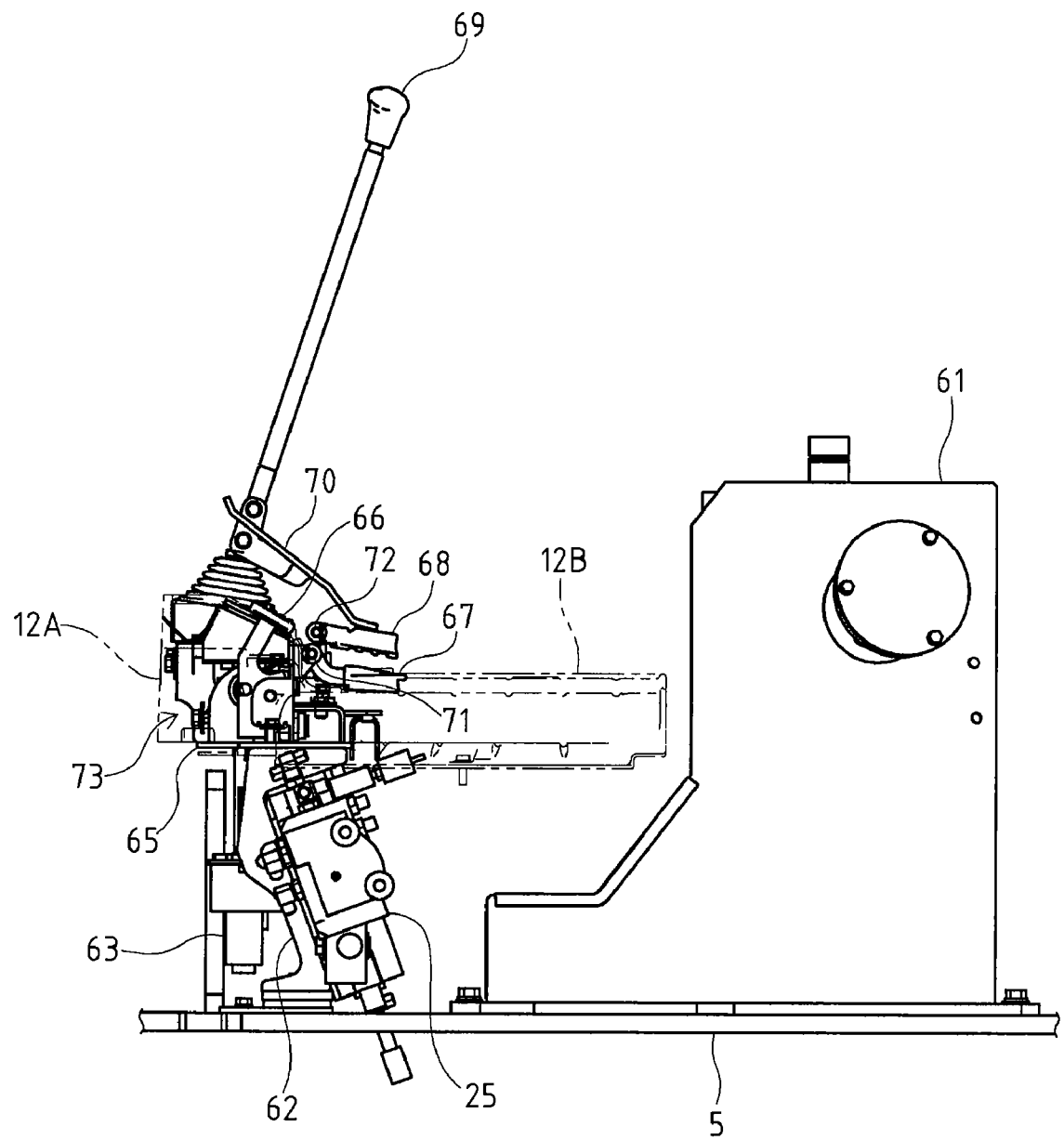
FIG. 14 is a left side view showing the arrangement structure of the rotation table frame.
Figure 15:
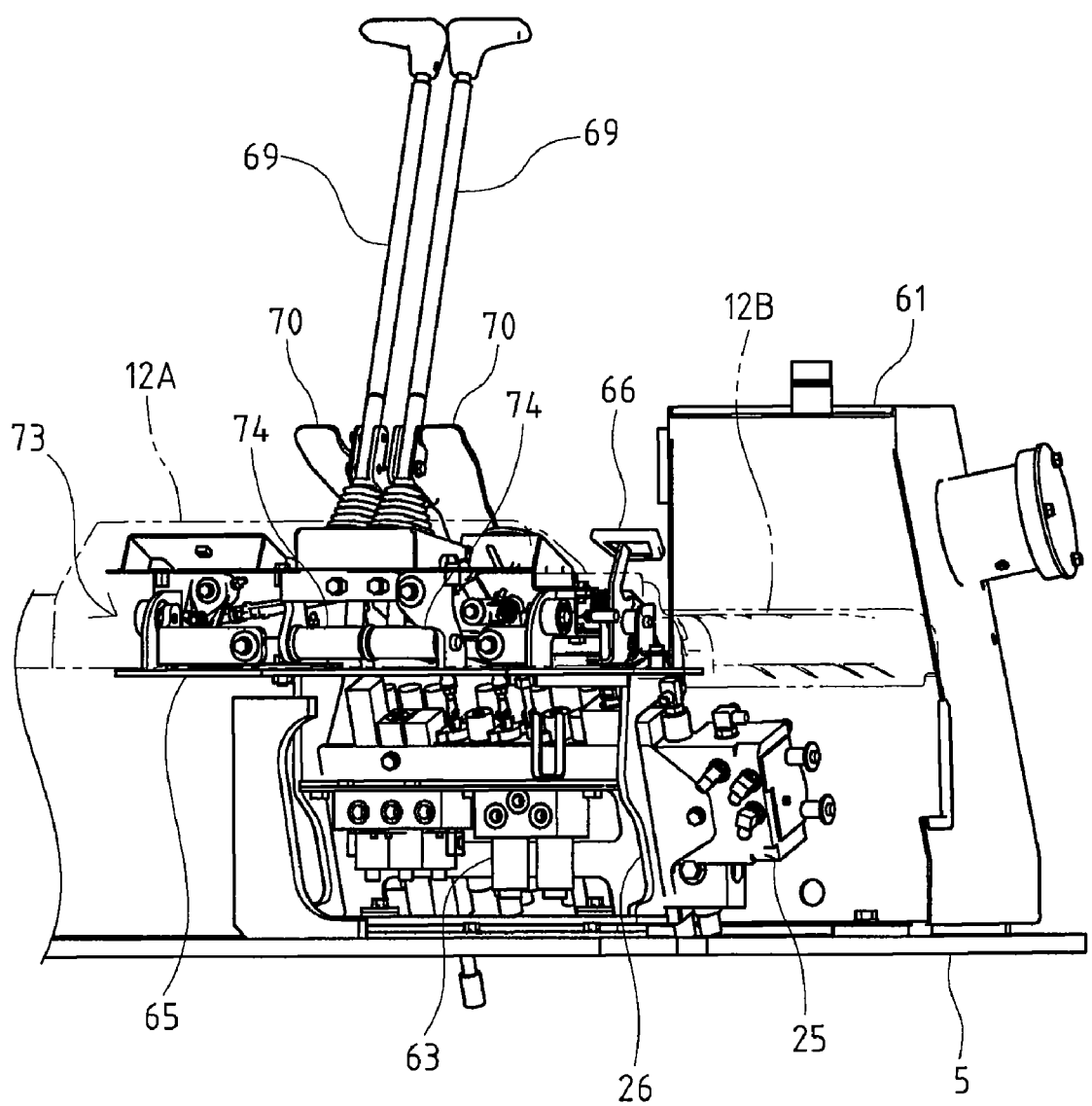
FIG. 15 is a perspective view showing the arrangement structure of the left side of the front part of the rotation table frame.

As shown in FIGS. 14 and 15, the control valve 25 is arranged on the front left part of the rotation table frame 5 at the front side of the reservoir tank 61, and the bracket 62 is held and fixed in a state raised in a tilted manner so as to be high on the front side and low on the rear side. Since the control valve 25 is arranged in a tilted manner, it can be arranged on the front side of the rotation table frame 5 as much as possible, and the rear end position of the control valve 25 can be positioned on the front side. The space on the rear side can be formed large, the front part of the reservoir tank 61 can be arranged in a bulging out manner in the relevant space, and the capacity of the reservoir tank 61 can be enlarged. An external take-out component 63 for breaker and the like which serves as a post-attachment working machine can be arranged in a space formed on the lower front side of the control valve 25.

A pedal base 65 is arranged on the upper end of the bracket 62 attached with the control valve 25, and the step 12 is arranged on the upper side of the pedal base 65. The step 12 includes a front step 12A covering the pedal base 65 and a back step 12B connected to the rear part of the step 12A, where a plurality of pedals and levers is arranged on the front step 12A or the back step 12B. In this case, a travel speed increasing pedal 66, a PTO operation pedal 67, and a swing pedal 68 are arranged lined in order from the left near the middle at the front part of the step 12, and a pair of left and right travel operation levers 69 are arranged between the PTO operation pedal 67 and the swing pedal 68 so as to project to the upper side. Operation pedals 70 are integrally arranged at the lower part of each left and right operation lever 69, so that the operation levers 69 can be operated with the operation pedals 70.

Figure 16:
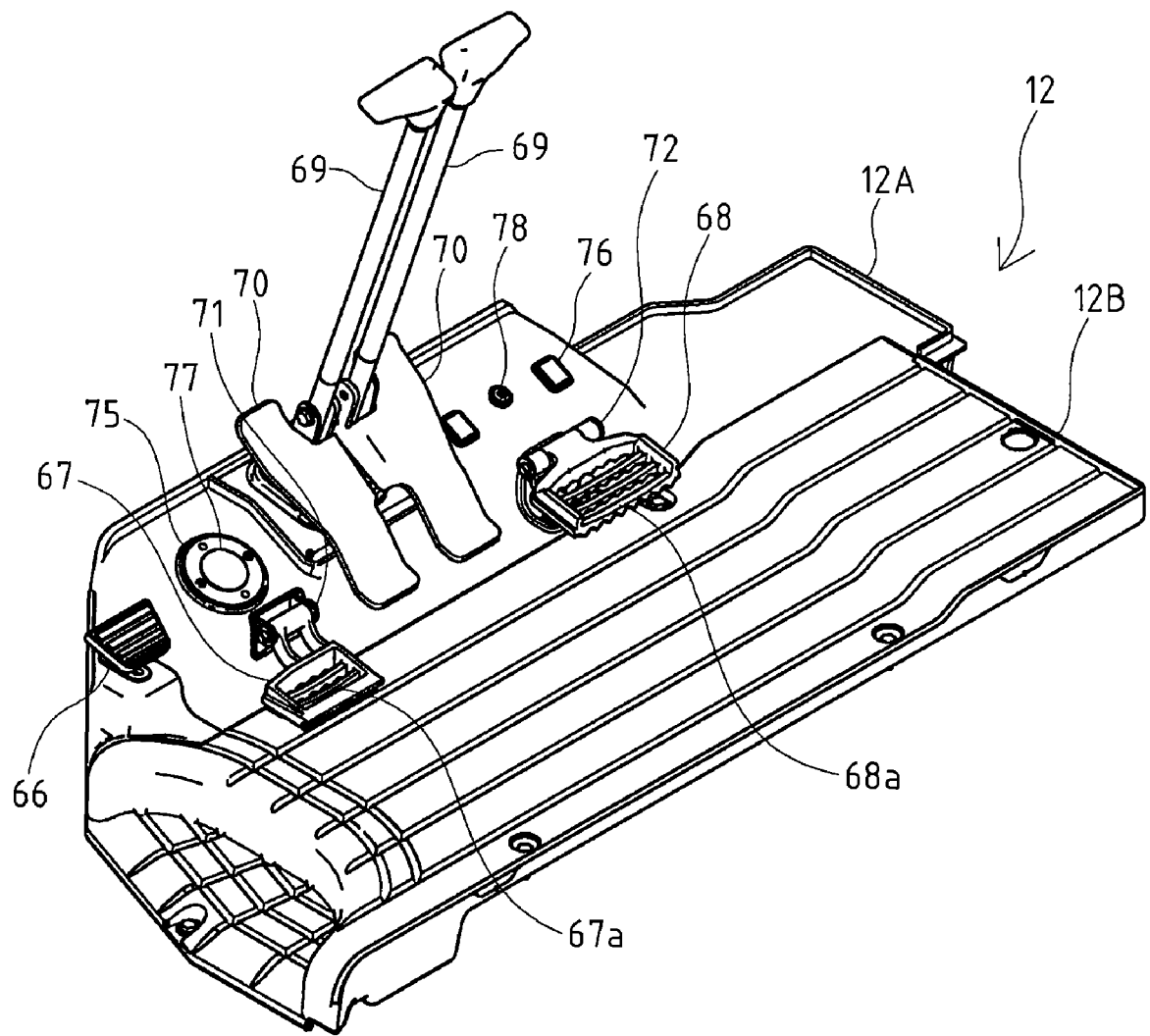
FIG. 16 is a perspective view showing a step part in a pedal operation state.
Figure 17:
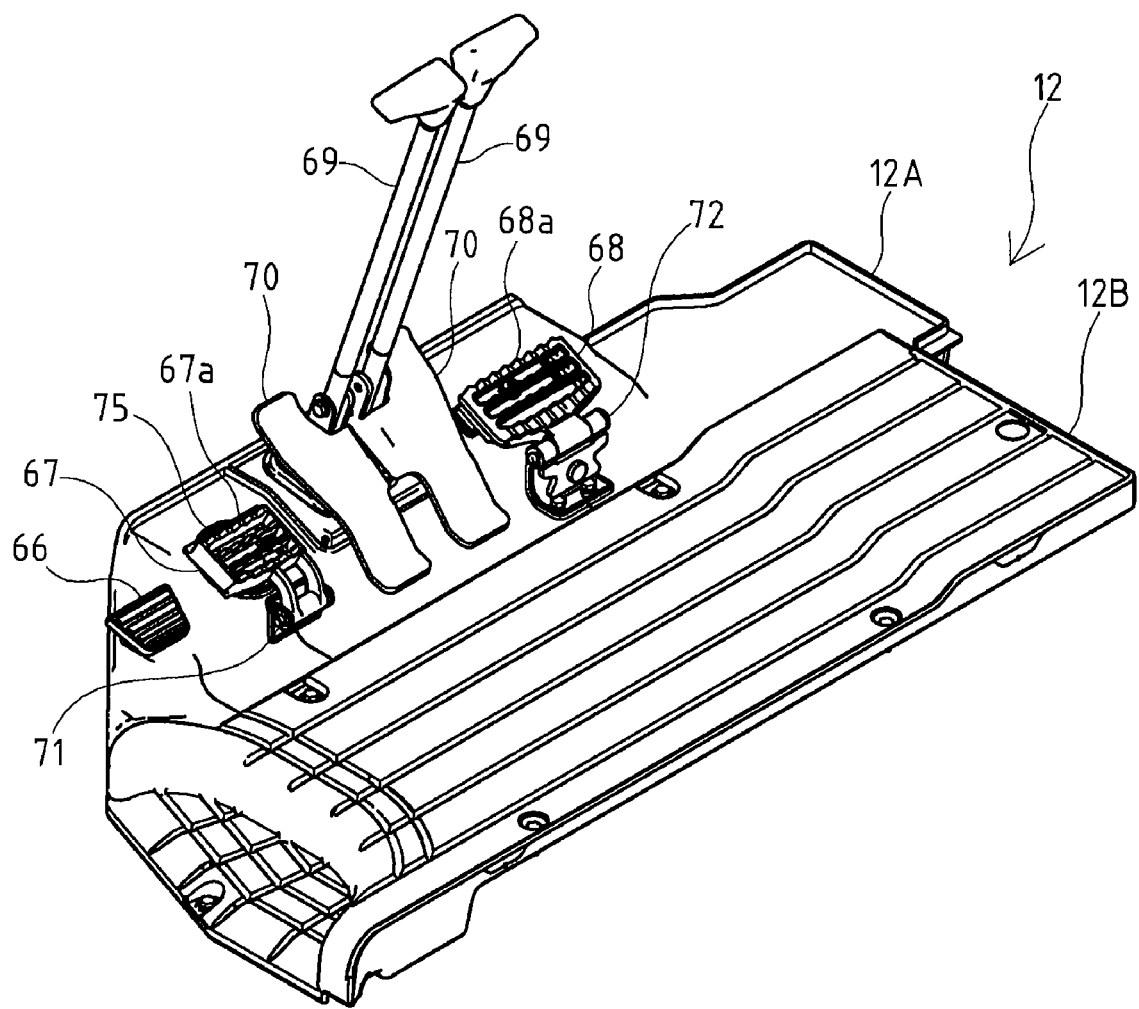
FIG. 17 is a perspective view of the step part in a pedal accommodating state.
Figure 18:
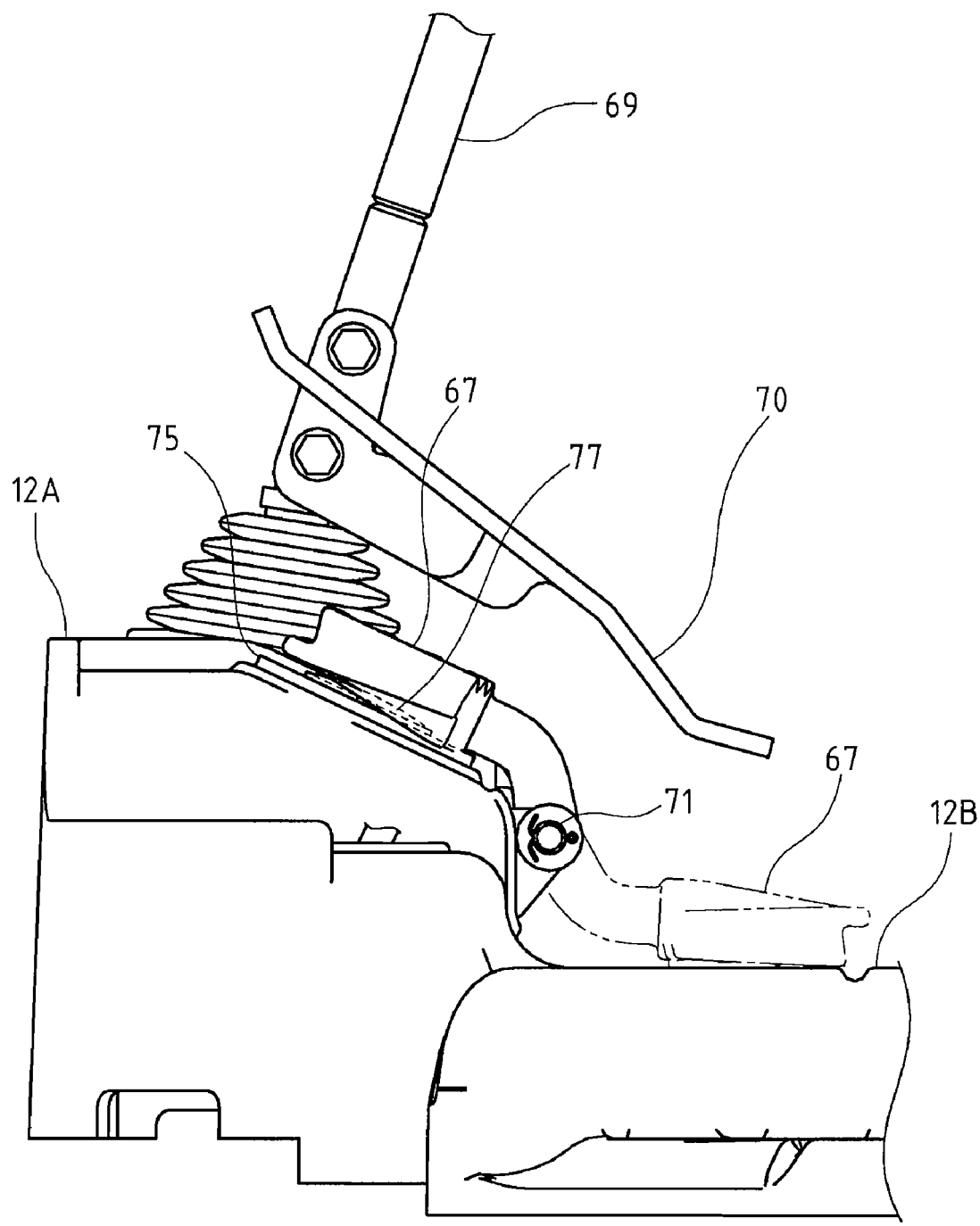
FIG. 18 is a side view of a pedal supporting part.

As shown in FIGS. 16 to 18, the PTO operation pedal 67 and the swing pedal 68 are supported in a freely front and back turning manner with the supporting point axes 71, 72 as the center at the pedal base 65 on one side (front side), and are connected to the control valve 25 by way of a link mechanism 73 arranged on the pedal base 65. Similarly, the operation levers 69 are supported in a freely front and back turning manner with the supporting point axes 74 as the center, and are connected to the control valve 25 by way of the link mechanism 73 arranged on the pedal base 65. Since the control valve 25 is arranged in a diagonally tilted manner with the front side high and the rear side low as described above, the distance between the upper end of the control valve 25 and the operation lever 69 or the operation pedal 70 is shorter than when arranged horizontally as in the prior art, whereby the link mechanism 73 for connecting the components has a simple structure, and the cost can be reduced. The operation pedals 70 can be stably pushed down and operated.

The PTO operation pedal 67 and the swing pedal 68 are formed into a substantially L-shape in side view, one side being arranged with foot placing parts 67a, 68a at both upper and lower surfaces and the other end being pivotally supported at the supporting point axes 71, 72, and are configured to be switchable between an operation state of being push-down operable by the turning in the front and back direction and a non-operable accommodating state (foot rest state). As shown in FIG. 16, each pedal 67, 68 is turned towards the rear side until positioned on the back step 12B and becomes an operable state when contacting the operation member of the hydraulic actuator in the link mechanism 73, and as shown in FIG. 17, turned towards the front side up to the front step 12A and becomes a non-operable accommodating state when contacting a receiving member 75, 76 exposed on the step 12A to be in the foot rest state.

Each pedal 67, 68 is formed such that the middle of the placing part 67a, 68a is depressed downward in the operation state, where when the foot is placed on the placing part 67a, 68a and pressed down, the pedal turns in the up and down direction with the supporting point axes 71, 72 as the center, whereby the control valve 25 is operated through the link mechanism 73. The swing pedal 68 is operated by being swung to the left and the right. When switched from the operable state to the accommodating state by hand and turned towards the front side, the receiving member 75, 76 is contacted at both left and right sides, and held on the front step 12A. Option switches 77, 78 are arranged at the middle of the receiving members 75, 76 so as to be covered by the upwardly convex placing parts 67a, 68a of the pedals 67, 68 when the pedals 67, 68 are accommodated.

When the operation of the PTO operation pedal 67 to the swing pedal 68 is not necessary in such structure, the pedal 67, 68 is turned toward the front side with the supporting point axis 71, 72 as the center to contact the receiving member 75 of the front step 12A, whereby the push-down operation of the pedal 67, 68 is disabled and false operation is prevented. At the same time, the option switches 77, 78 are covered by the placing parts 67a, 68a of the pedals 67, 68, and false operation thereof is also prevented. The lower surface of the placing parts 67a, 68a of the pedals 67, 68 can also be used as a foot rest, whereby the space for the foot portion of the operator at the step 12 can be efficiently used.

When operation of the PTO operation pedal 67 or the swing pedal 68 becomes necessary, the pedal 67, 68 is turned towards the rear side with the supporting point axis 71, 72 as the center and arranged on the back step 12B, so that push-down operation becomes possible. Therefore, if pedals 67, 68 are not necessary, the pedals 67, 68 themselves are turned towards the front side from the back step 12B and easily accommodated in the front step 12A, and the space for the foot portion of the operator at the step 12 can be enlarged. Since the non-operable state can be maintained by simply turning the pedals 67, 68 towards the front side, a pedal cover that disables the pedal as in the prior art is not necessary, and the number of components can be reduced.

Figure 19:
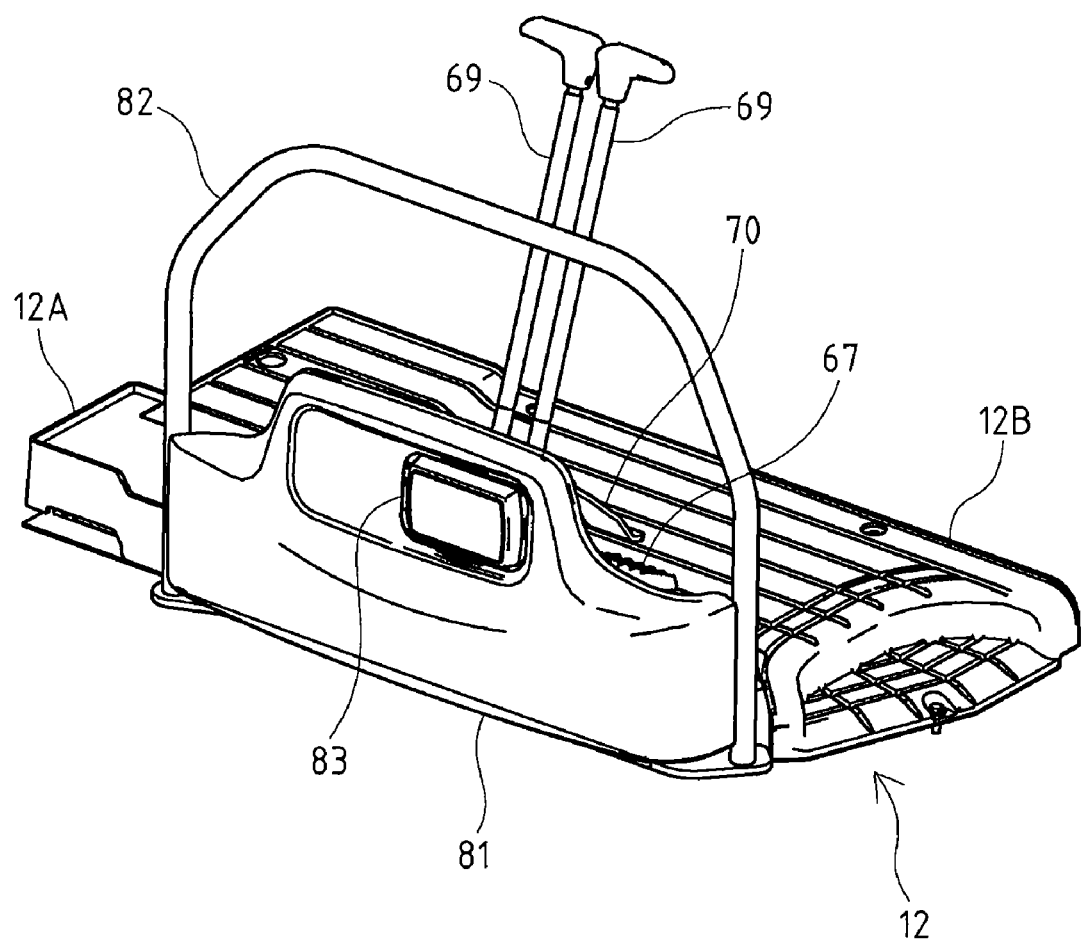
FIG. 19 is a perspective view of a front cover.
Figure 20:
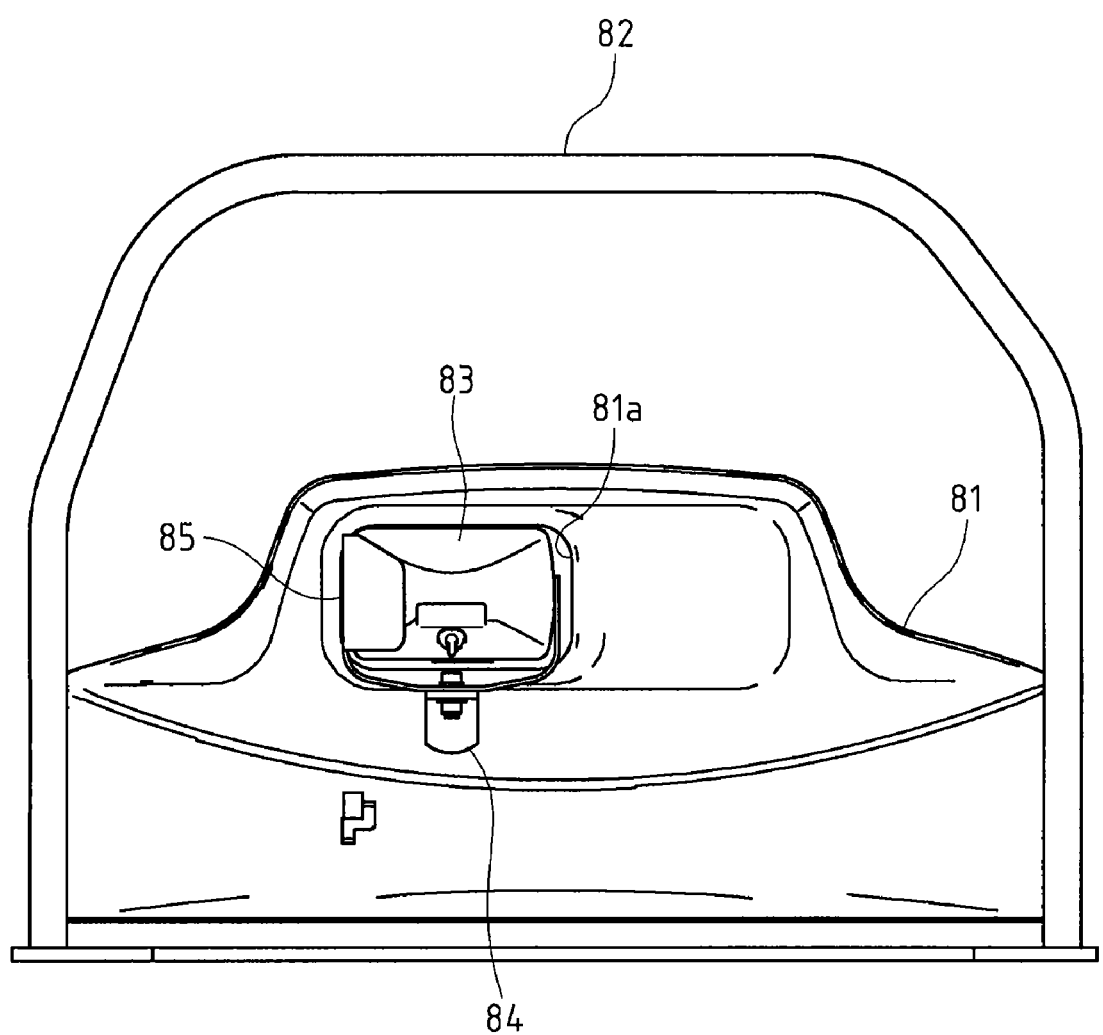
FIG. 20 is a rear view of the front cover.
Figure 21:
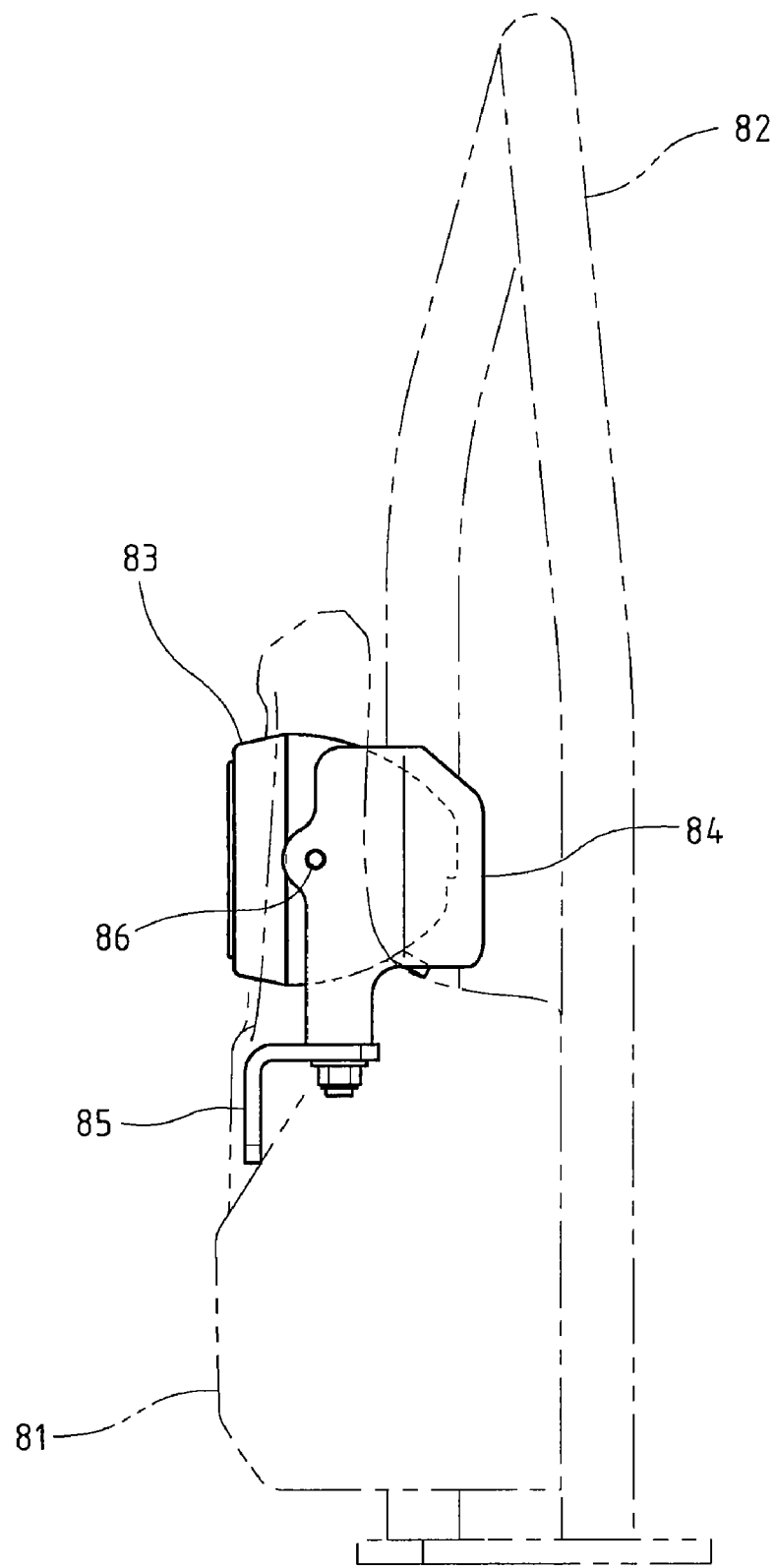
FIG. 21 is a side view showing a supporting structure of a front lamp.

As shown in FIG. 2, the front cover 81 is arranged at the front end part of the step 12 so as to cover the front side of the PTO operation pedal 67, the swing pedal 68 and the like. As shown in FIG. 19 to FIG. 21, the front cover 81 is formed to a convex form in front view, and is transversely arranged between a handrail 82 of a substantially gate shape in front view arranged in an upstanding manner at the front part of the step 12. An opening 81a is formed at the upper part at the middle of the front cover 81, and a front lamp 83 is arranged in the opening 81a so as to be at a position as high as possible on the front side of the drive operation unit 13. Thus, the front side of the operator can be lighted by the front lamp 83, which improves the surrounding visibility.

The front cover 81 is arranged such that the upper part of both left and right sides are positioned on the front side of the pedals 67, 68 arranged on both left and right sides of the step 12. Thus, when stretching the leg towards the front side of the pedal, the legs can be stretched towards the front side from both left and right sides of the front cover 81, thereby enlarging the space of the foot portion of the operator.

Figure 22:
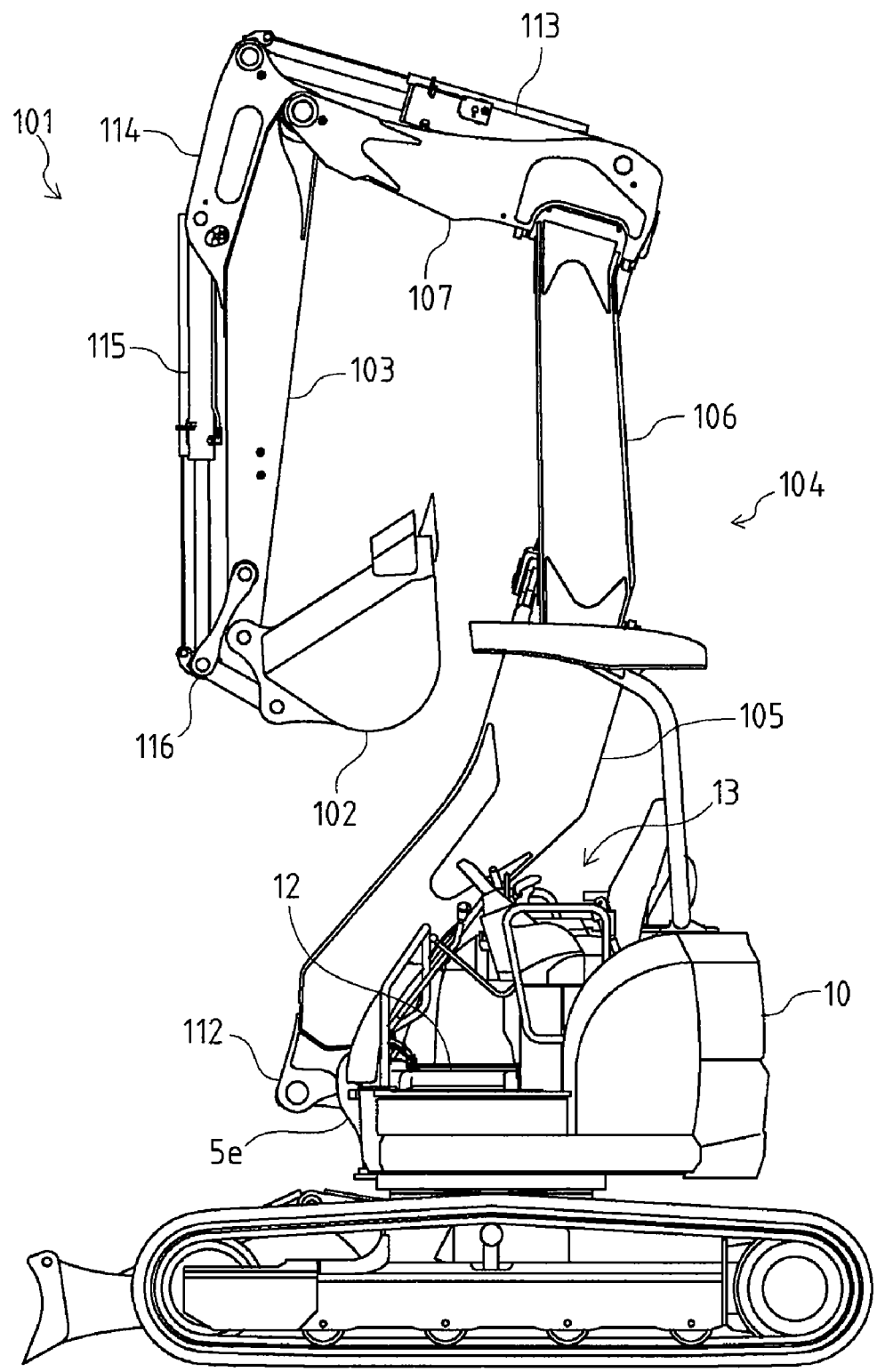
FIG. 22 is a left side view of an ultraminiature rotary type rotary working machine according to one example of the present invention.

The rotation table frame 5 including the engine 8, the hydraulic pump 26, the fuel tank, the hydraulic oil tank, the radiator, and the like is arranged with an attachment part at the middle in the left and right direction of a line extending in the left and right direction of the front part thereof to attach the working machine 1, so that the rotary working machine of a rear ultraminiature rotary type is obtained, but an attachment part may be arranged at the step difference part 5c formed on the right side of the front part to attach the working machine, so that the rotary working machine of an ultraminiature rotary type is obtained, as shown in FIG. 22. That is, the rear ultraminiature rotary type and the ultraminiature rotary type rotary working machine have a common shape other than the front end of the rotation table frame 5, and thus can be commonly used. Therefore, the molding die of the rotation table frame 5 in the rear ultraminiature rotary type and the ultraminiature rotary type rotary working machine can be shared, which enhances productivity and reduces cost.

Figure 23:
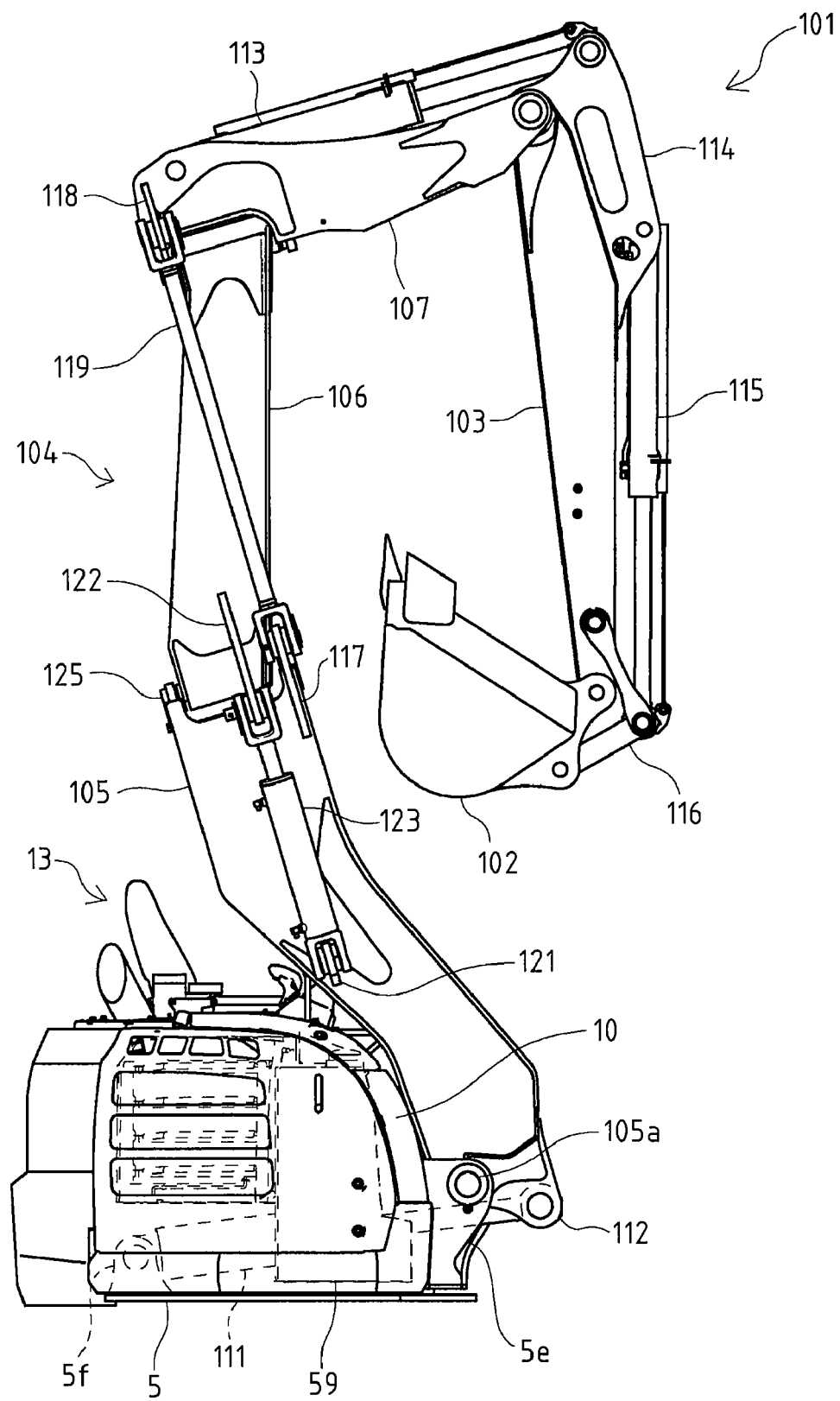
FIG. 23 is a right side view of an upper part of the ultraminiature rotary type rotary working machine.
Figure 24:
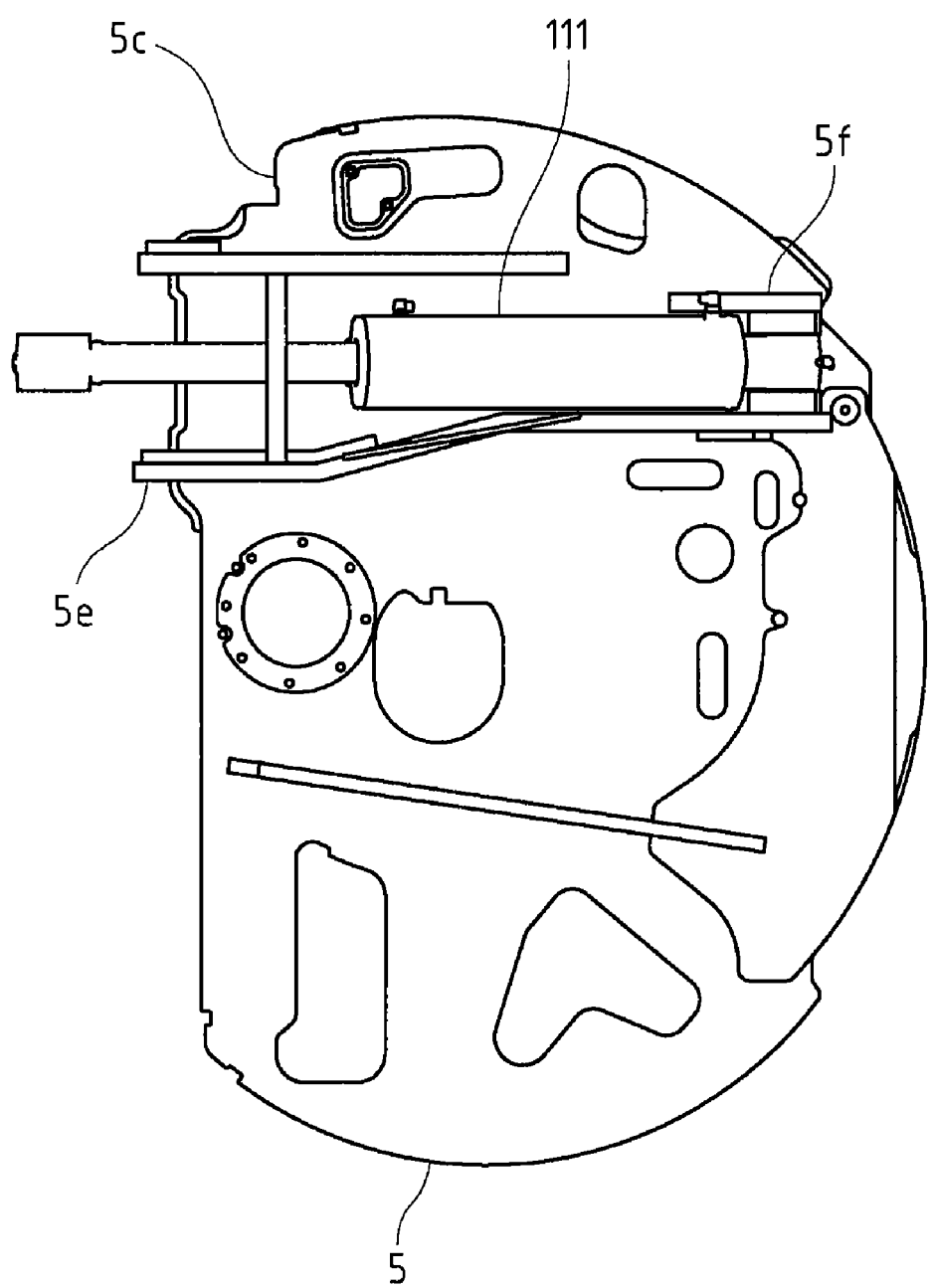
FIG. 24 is a plan view of the rotation table frame.

As shown in FIG. 23 and FIG. 24, when the ultraminiature rotary type rotary working machine is configured using such rotation table frame 5, the working machine 101 is pivotally supported by a pivotally supporting part 5e at the step difference part 5c of the rotation table frame 5 so that the supporting point 105a is positioned within the rotary radius, and is arranged closer to the right side with respect to the rotation table frame 5. The space of the drive operation unit 13 arranged on symmetrically opposite side of the working machine is ensured as wide as possible, and the comfortability of the drive operation unit 13 improves.

Figure 25:
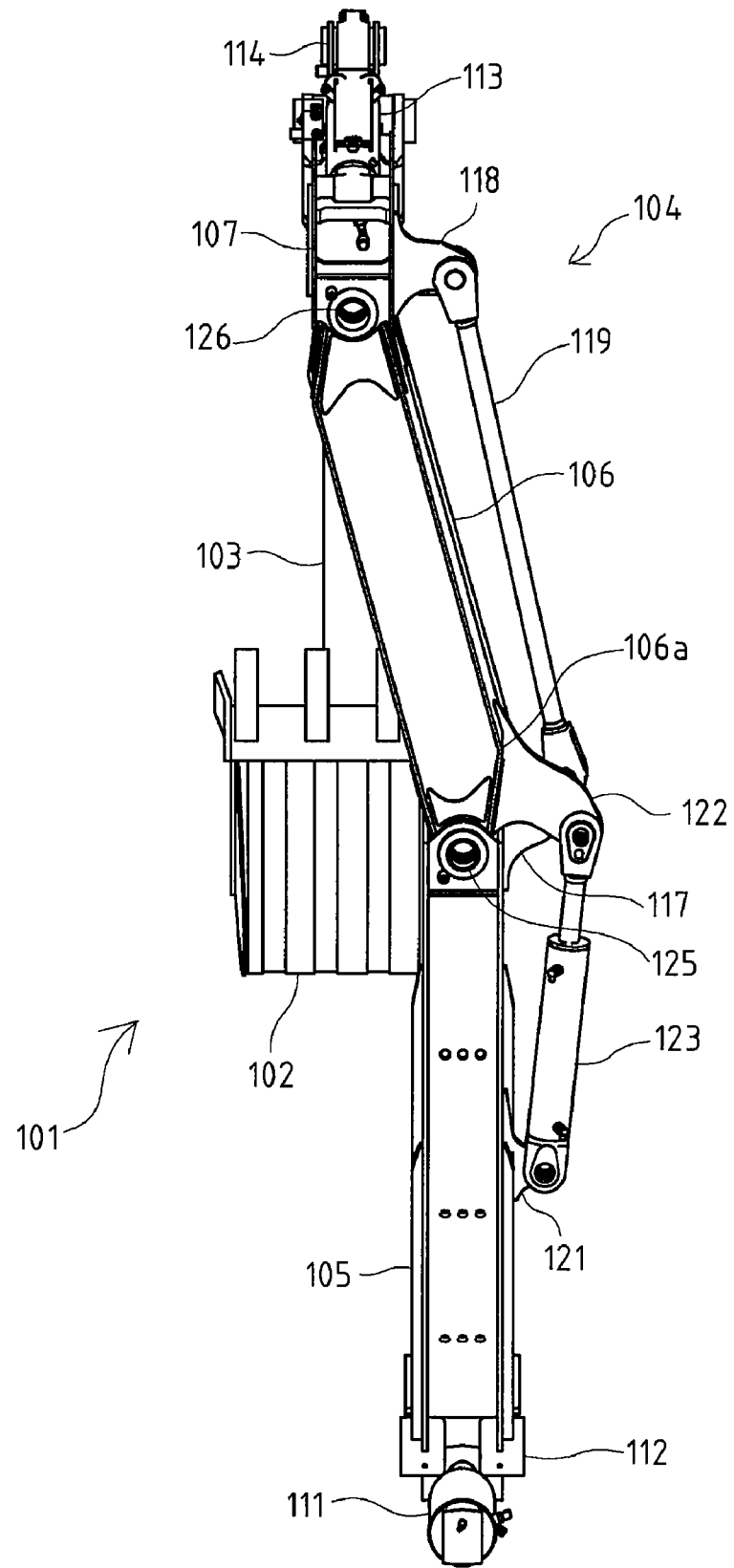
FIG. 25 is a rear view of the offset type working machine.

As shown in FIG. 23 and FIG. 25, the working machine 101 includes a bucket 102, an arm 103, a boom 104, and a hydraulic cylinder for operating the same, and is configured as an offset type working machine in which the bucket 102 serving as an attachment is movable in the left and right direction with respect to the boom 104. The boom 104 has, from the basal side, a first boom 105, a second boom 106, and a third boom 107 connected in order towards distal end side from the main equipment side, where the base part of the first boom 105 is pivotally supported in an up and down (front and back) turning manner by the pivotally supporting part Se on the step difference part 5c of the rotation table frame 5, the base part of the second boom 106 is pivotally supported in a left and right turning manner at the distal end of the first boom 105, and the base part of the third boom 107 is pivotally supported in a left and right turning manner at the distal end of the second boom 106. The base part of the arm 103 is pivotally supported in an up and down turning manner at the distal end of the boom 104, that is, the distal end of the third boom 107, and the bucket 102 is pivotally supported in a front and back turning manner at the distal end of the arm 103.

A boom turning boom cylinder 111 is interposed between the bracket 112 arranged projecting downward from a supporting point 105a at the base part of the first boom 105 and a pivotally supporting part 5f arranged at the rear part of the rotation table frame 5; an arm turning arm cylinder 113 is interposed between the arm bracket 114 arranged projecting upward from the base part of the arm 103 and the base part of the third boom 107; and a bucket turning bucket cylinder 115 is interposed between the link mechanism 116 of the bucket 102 and the arm bracket 114. The boom 104 then can be turned by the extension drive of the boom cylinder 111, the arm 103 can be turned by the extension drive of the arm cylinder 113, and the bucket 102 can be turned by the extension drive of the bucket cylinder 115.

An offset rod 119 is interposed between the bracket 117 arranged projecting to the right side surface on the distal end side of the first boom 105 and the bracket 118 projecting to the right side surface on the base part side of the third boom 107, and an offset cylinder 123 is interposed between the bracket 121 arranged projecting to the right side surface at the middle of the first boom 105 and the bracket 122 arranged projecting to the right side surface of the base part of the second boom 106. In this manner, the second boom 106 turns to the left and the right when the offset cylinder 123 is extension driven, the offset rod 109 also turns to the left and the right in conjunction with the turning of the second boom 106, and the third boom 107, the arm 103, and the bucket 102 arranged at the distal end side from the third boom 107 substantially parallel move (offset movement) to the left and the right without tilting to the left or the right in rear view.

Figure 26:
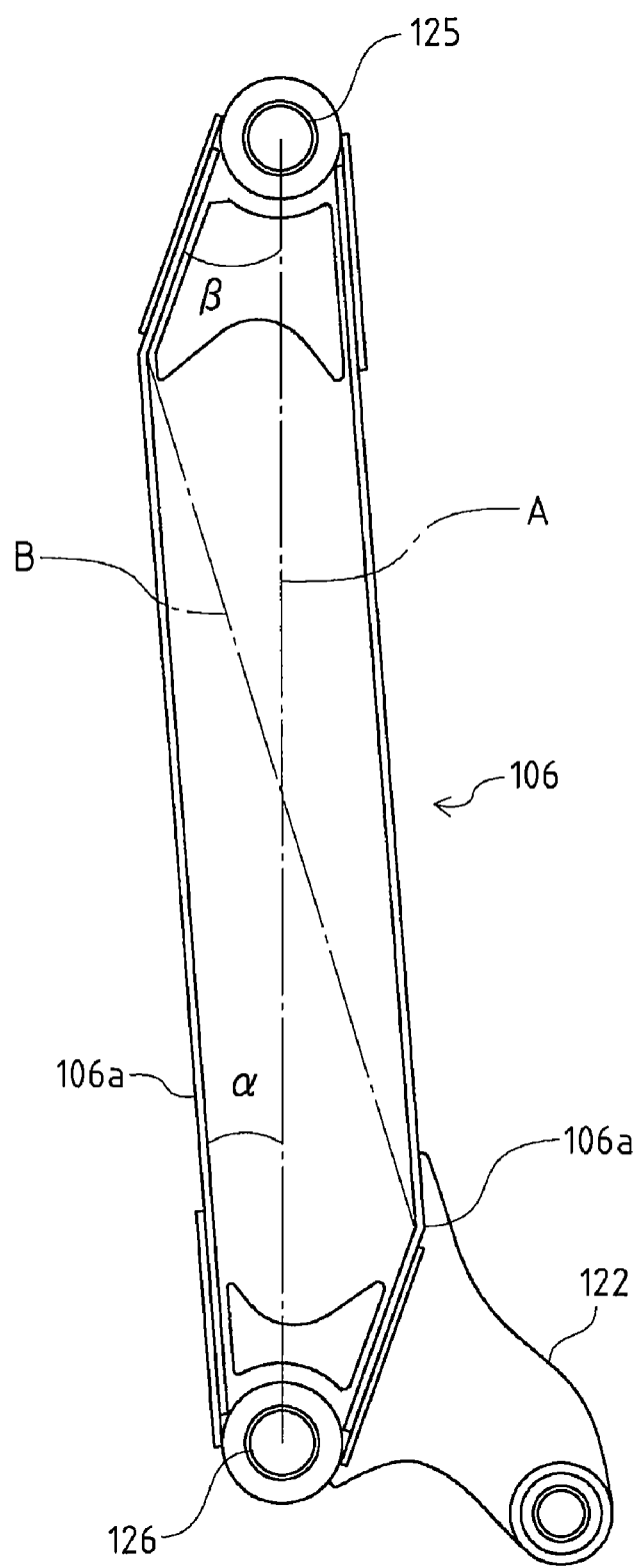
FIG. 26 is a rear view of a second boon.

As shown in FIG. 26, the second boom 106 is formed to a substantially parallelogram shape in rear view with the boom 104 turned to the most rear side, where one diagonal line A is arranged in the up and down direction, the other diagonal line B is arranged slanted to the middle side in the left and right direction of the equipment body, and the first boom 105 and the third boom 107 are respectively pivotally supported by the pivot supporting shaft 125, 126 arranged on both ends of the former diagonal line A. In other words, assuming the second boom 106 has a substantially parallelogram shape, the angle α between the diagonal line A in the front and back direction (up and down direction) and the side 106b of the base part side on the inner side of the equipment body is smaller than the angle β between the diagonal line A and the side 106c of the distal end side on the inner side of the equipment body.

Accordingly, the projection on the inner side of the base part becomes small without lowering the rigidity of the second boom 106 and thus is less likely to contact the inner side of the distal end part of the first boom 105, and the second boom 106 can be greatly turned to the inner side of the main equipment body. Since the offset amount of the second boom 106 can be increased, the first boom 105 can be arranged on the outer side of the equipment body as much as possible, and the space of the drive operation unit 13 can be enlarged. In this case, since the portion 106a bulging out towards the outer side of the base part side of the second boom 106 is greater than the bulging to the inner side at the same upper and lower positions, the bracket 122 which is the pivotally supporting part of the piston rod of the offset cylinder 123 for turning the second boom 106 can be arranged further projecting to the outer side at the portion 106a projecting to the outer side of the base part side of the second boom 106, and thus the second boom 106 can be greatly turned to the inner side of the main equipment.

Furthermore, the first boom 105 is formed to a substantially S-shape in side view. The first boom 105 is configured such that the bucket 102 enters the space formed on the distal end side and at the same time so that the front part of the bonnet 10 enters the rear space formed on the base part side when the working machine 101 is at the most rear side position and the bucket 102 is turned to approach the boom 104 through the arm 103. Accordingly, the bucket 102 can be positioned on the main equipment side on the rear side as much as possible without increasing the turning angle to the rear side of the first boom 105, that is, the working machine 101, and the rotary radius can be made small.

As shown in FIG. 23, the boom cylinder 111 for turning the boom 104 is accommodated in the bonnet 10 at the rear side of the step difference part 5c of the rotation table frame 5, and is arranged so as to be positioned on the lower side from the step 12 arranged in the drive operation unit 13. The wide space in the bonnet 10 is ensured, the capacity of the fuel tank 59, the reservoir tank 61, and the like to be accommodated in the space can be increased or the space through which the cooling airflow flows can be reliably ensured. Miniaturization and lighter weight of the working machine 101 can be achieved by arranging the boom cylinder 111 on the main equipment side instead of the working machine 101 side.

In the ultraminiature rotary type rotary working machine including the offset type working machine 101 described above, the boom cylinder 111 is arranged at substantially the same position as the swing cylinder 28 of the rear ultraminiature rotary type rotary working machine on the rotation table frame 5, and the fuel tank 59 and the radiator 40 are arranged lined in the front and the back direction on the upper side of the boom cylinder 111 on the rotation table frame 5 similar to above, and the engine 8 and the reservoir tank 61 are arranged side by side at the side of the radiator 40. Various equipments are thus efficiently arranged on the rotation table frame 5, where the layout is configured to be shared between the rear ultraminiature rotary type and the ultraminiature rotary type rotary working machine.

INDUSTRIAL APPLICABILITY

The rotary working machine of the present invention enables the canopy installation member for installing the canopy to be firmly fixed on the rotation table frame, and thus is industrially effective.

The invention claimed is:

1. A rotary working machine comprising:
  a rotation table frame;
  a working machine attached at a front part of the rotation table frame;
  an engine mounted on the rotation table frame;
  a canopy detachably installed at a rear of the rotation table frame;
  a supporting body integrally configured with a horizontally placed frame-like engine support member and a canopy installation member,
  wherein the engine support member includes frames arranged and connected in a frame shape, so that the engine is placed and fixed onto the frames of the engine support member,
  wherein the canopy installation member includes a pair of column-shaped frames projecting upward from one of the frames of the engine support member, and includes a horizontal canopy installation plate transversely arranged between the column-shaped frames, the canopy installation plate being adapted to have the canopy attached thereto, and
  wherein the supporting body is fixed to the rotation table frame by connecting any of the frames of the engine support member to the rotation table frame.

2. The rotary working machine according to claim 1, further comprising:
  a battery mounting base fixed to the canopy installation member of the supporting body; and
  a battery attached to the engine and supported on the battery mounting base.

3. The rotary working machine according to claim 1, further comprising:
  a radiator attached to the canopy installation member of the supporting body.

4. The rotary working machine according to claim 1, further comprising:
  an air cleaner attached to the canopy installation member of the supporting body.

5. The rotary working machine according to claim 1, further comprising:
  a reinforcement member arranged between the canopy installation member and the engine support member of the supporting body.

6. The rotary working machine according to claim 5, further comprising:
  a muffler attached to the reinforcement member.

7. The rotary working machine according to claim 5, wherein the reinforcement member includes a vertical part and a horizontal part connected to each other, wherein the vertical part is connected at a lower part thereof to the frame of the engine support member opposite to the frame from which the column-shaped frames project, and wherein the horizontal part is connected at one end thereof to the canopy installation plate.

8. The rotary working machine according to claim 7, further comprising:
  a muffler attached to the reinforcement member.

* * * * *